Nov. 22, 1927.

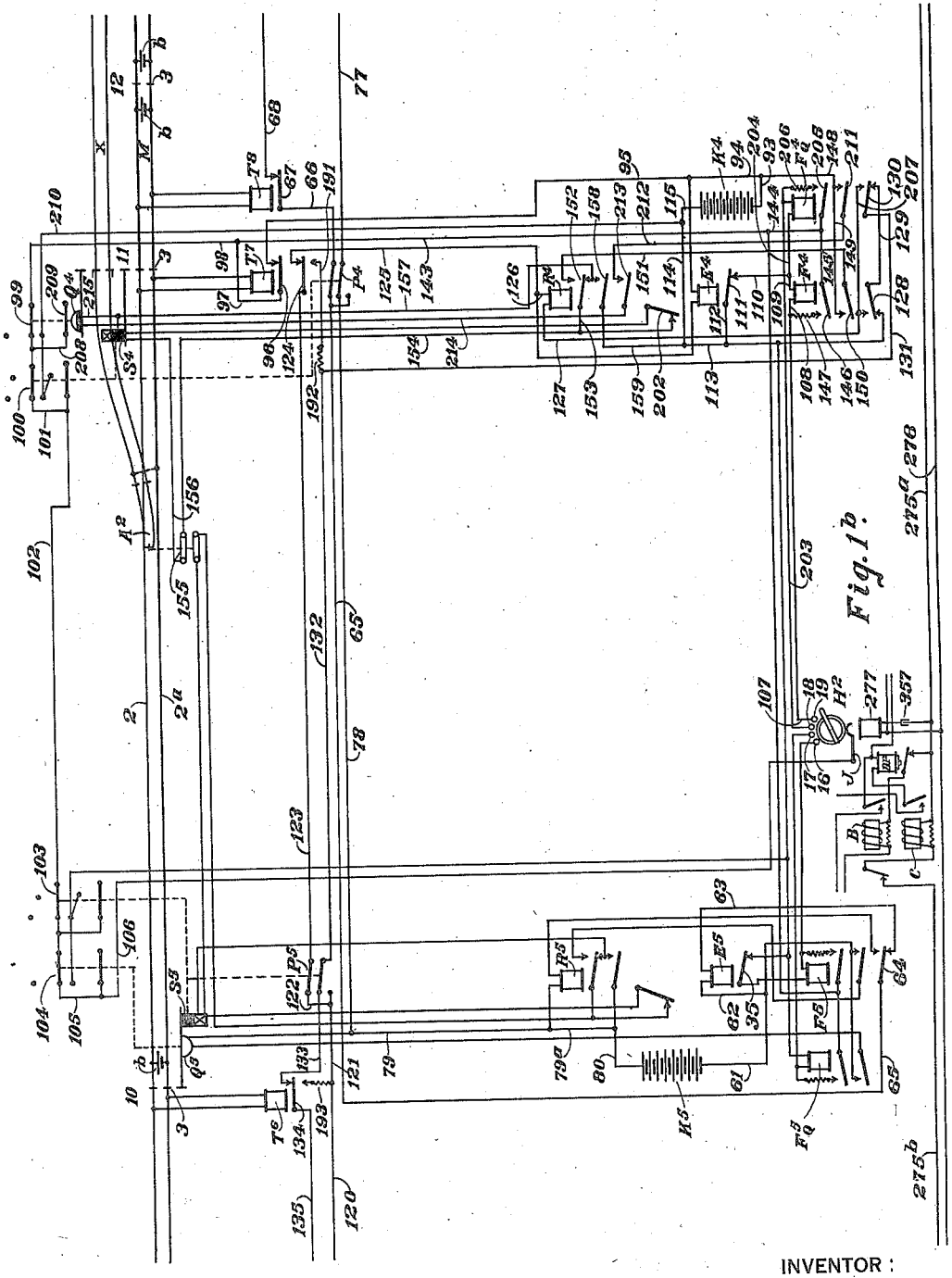

H. A. WALLACE 1,650,575

RAILWAY TRAFFIC GOVERNING APPARATUS

Filed March 20, 1922      11 Sheets-Sheet 3

INVENTOR:
H. A. Wallace,
BY
ATTORNEY

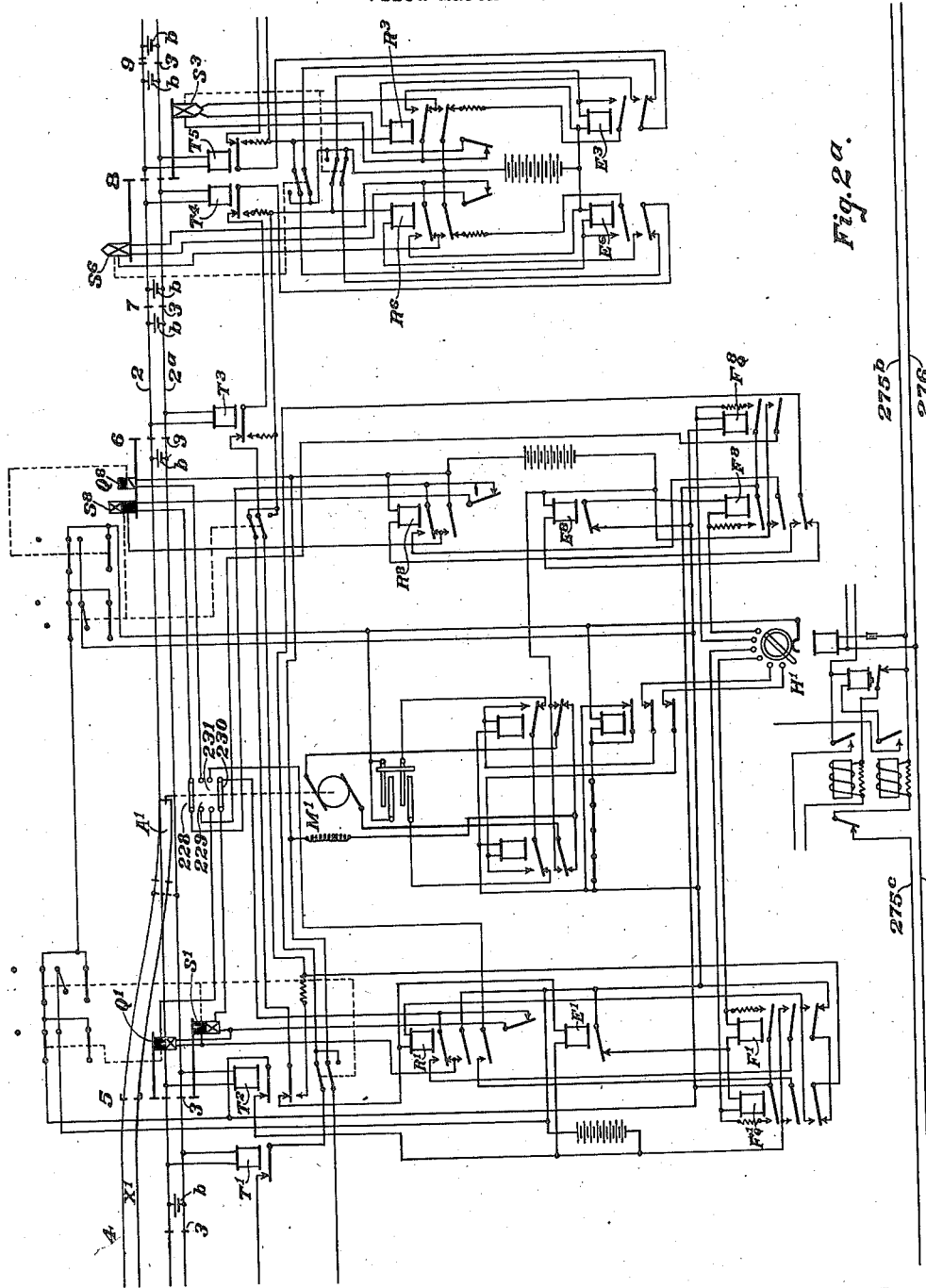

Nov. 22, 1927.  
H. A. WALLACE  
1,650,575  
RAILWAY TRAFFIC GOVERNING APPARATUS  
Filed March 20, 1922   11 Sheets-Sheet 5
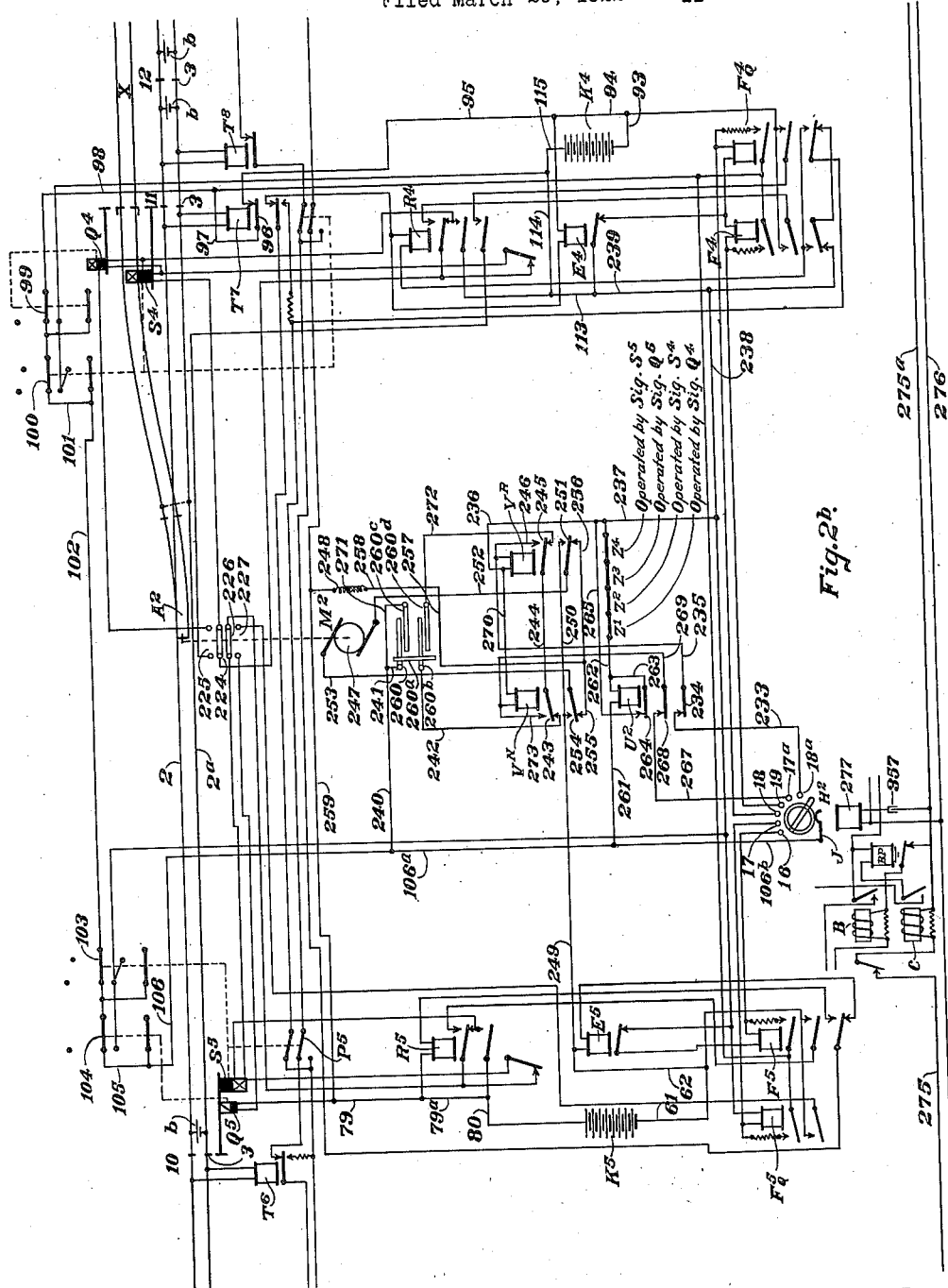
INVENTOR:  
H. A. Wallace,  
BY A. L. Tincall  
ATTORNEY

Figure 3B:
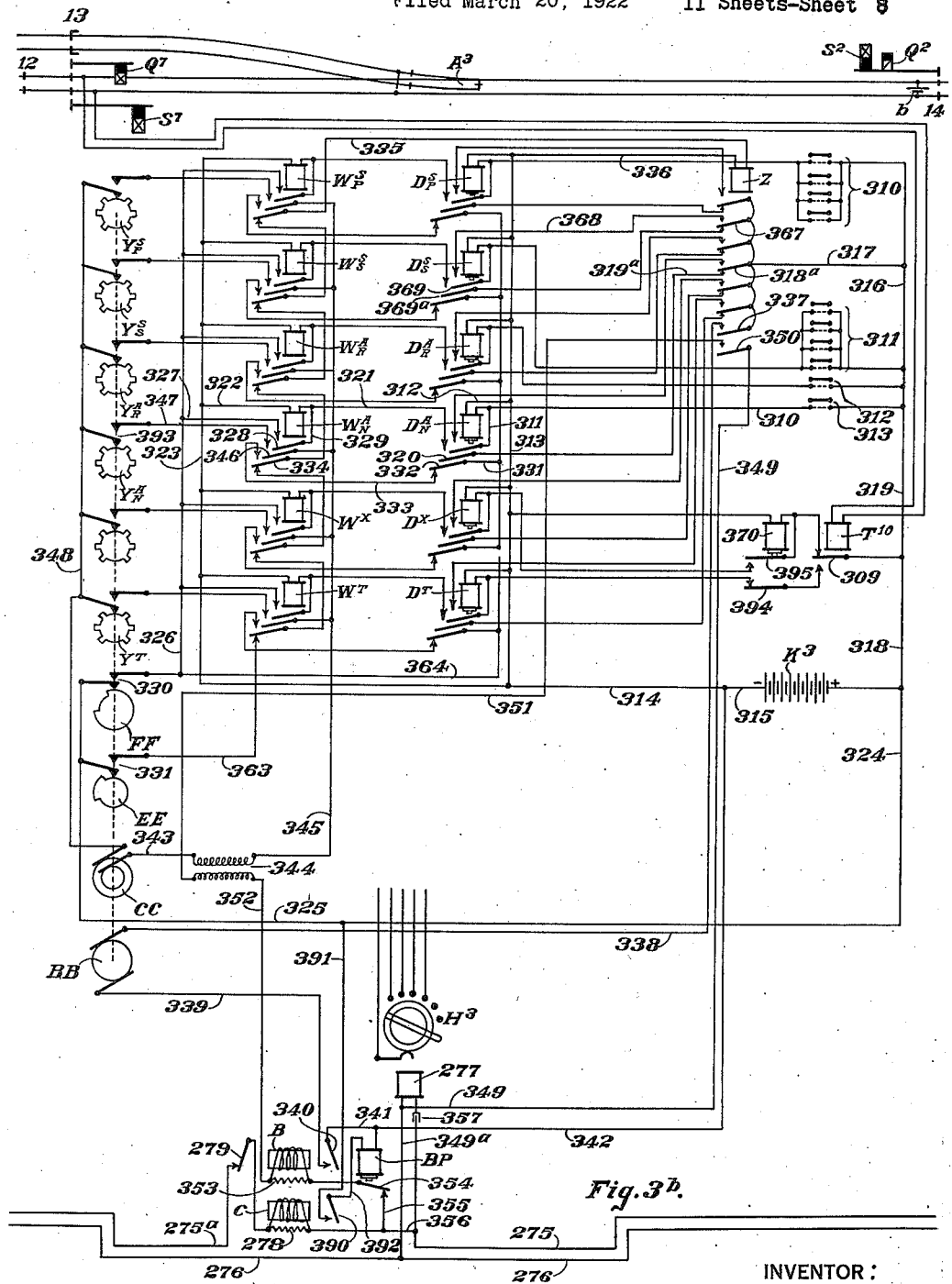

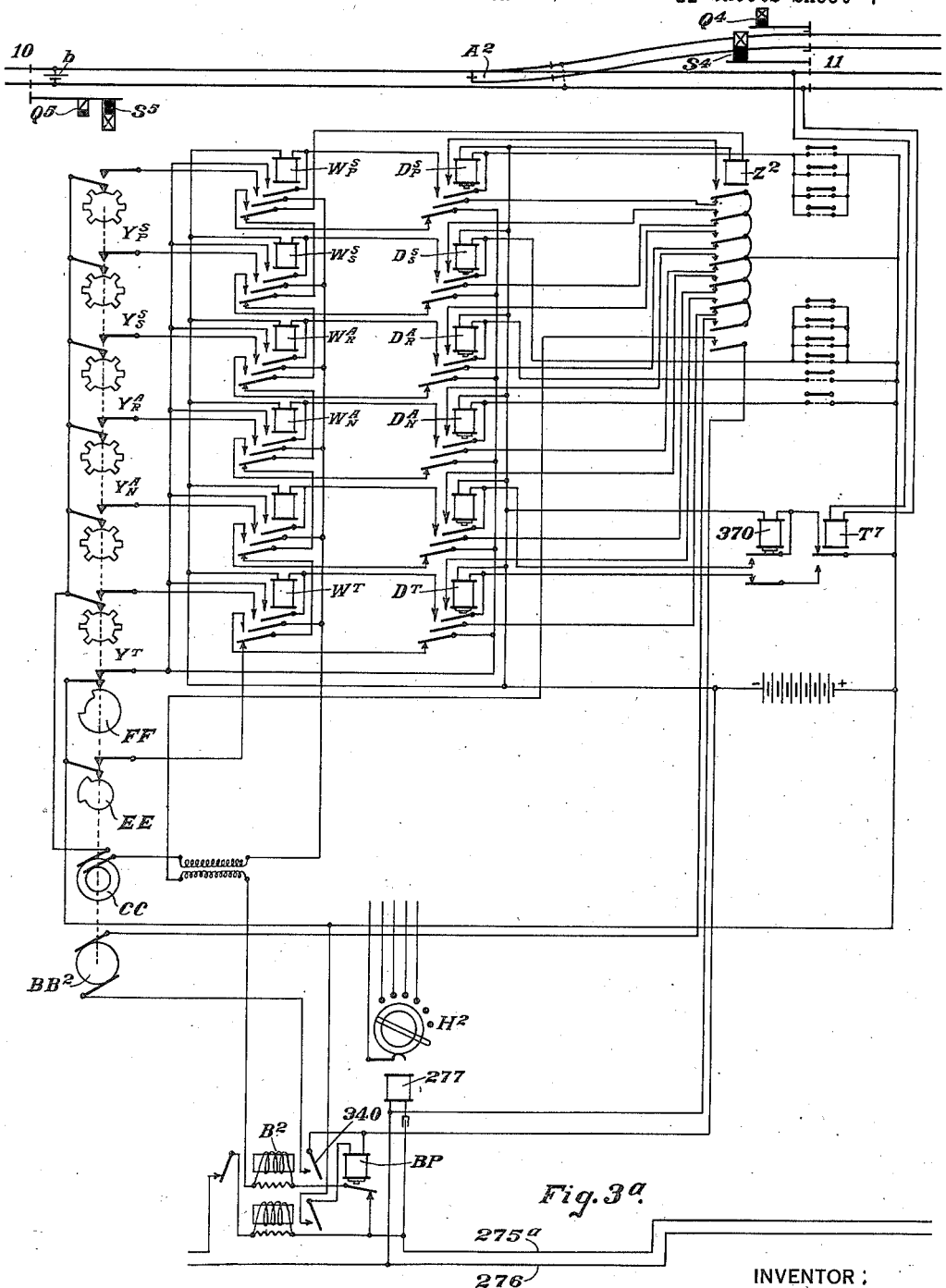
Fig.3ª.

Nov. 22, 1927.  H. A. WALLACE  1,650,575
RAILWAY TRAFFIC GOVERNING APPARATUS
Filed March 20, 1922   11 Sheets-Sheet 8

INVENTOR:
H. A. Wallace,
BY
His ATTORNEY

Nov. 22, 1927.  
H. A. WALLACE  
1,650,575  
RAILWAY TRAFFIC GOVERNING APPARATUS  
Filed March 20, 1922    11 Sheets-Sheet 9

INVENTOR:  
H. A. Wallace,  
BY A. L. Vencill  
His ATTORNEY

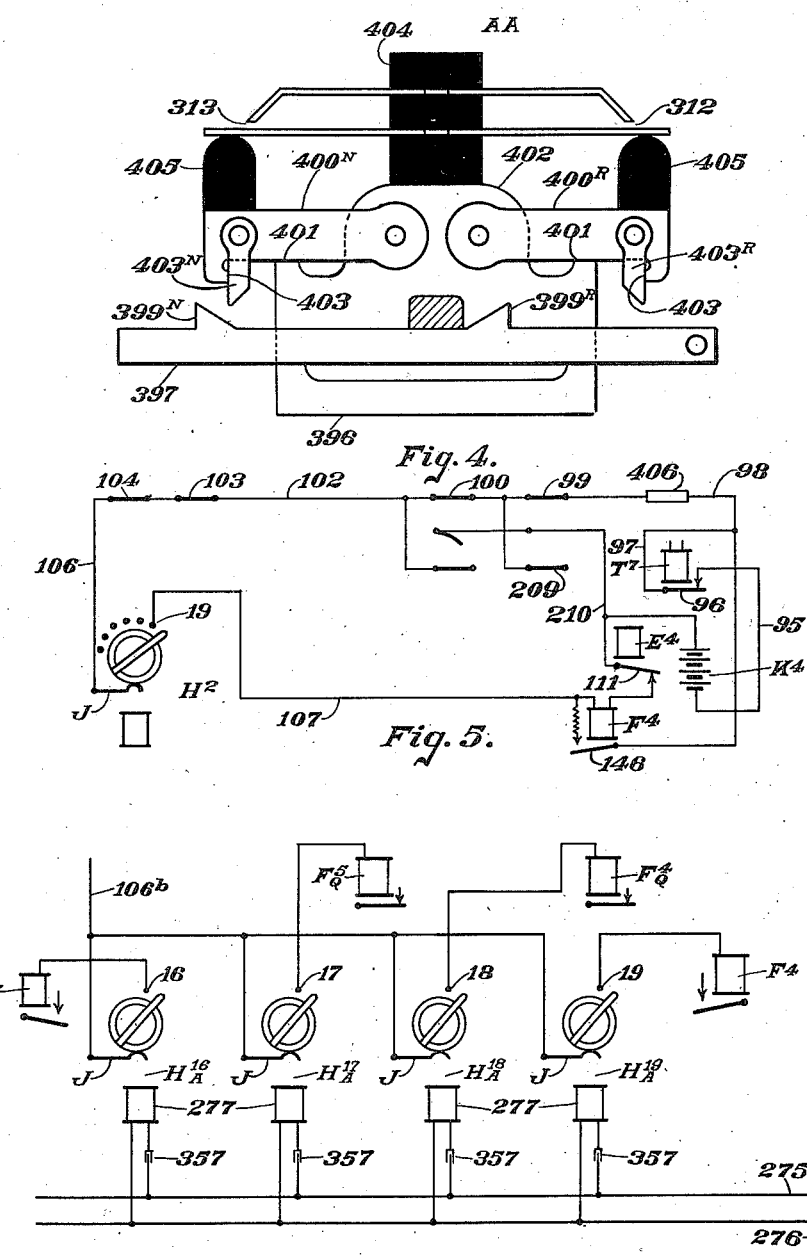

Nov. 22, 1927.

H. A. WALLACE 1,650,575

RAILWAY TRAFFIC GOVERNING APPARATUS

Filed March 20, 1922   11 Sheets-Sheet 11

INVENTOR:
H. A. Wallace,
BY A. L. Vencill
His ATTORNEY

Patented Nov. 22, 1927.

1,650,575

UNITED STATES PATENT OFFICE.

HERBERT A. WALLACE, OF PITTSBURGH, PENNSYLVANIA.

RAILWAY-TRAFFIC-GOVERNING APPARATUS.

Application filed March 20, 1922. Serial No. 545,103.

My invention relates to railway traffic governing apparatus, and has for an object the provision of means for safely controlling traffic governing devices such as switches and signals from a distant point.

I will describe certain forms of apparatus embodying my invention, and will then point out the novel features thereof in claims.

Figure 7:
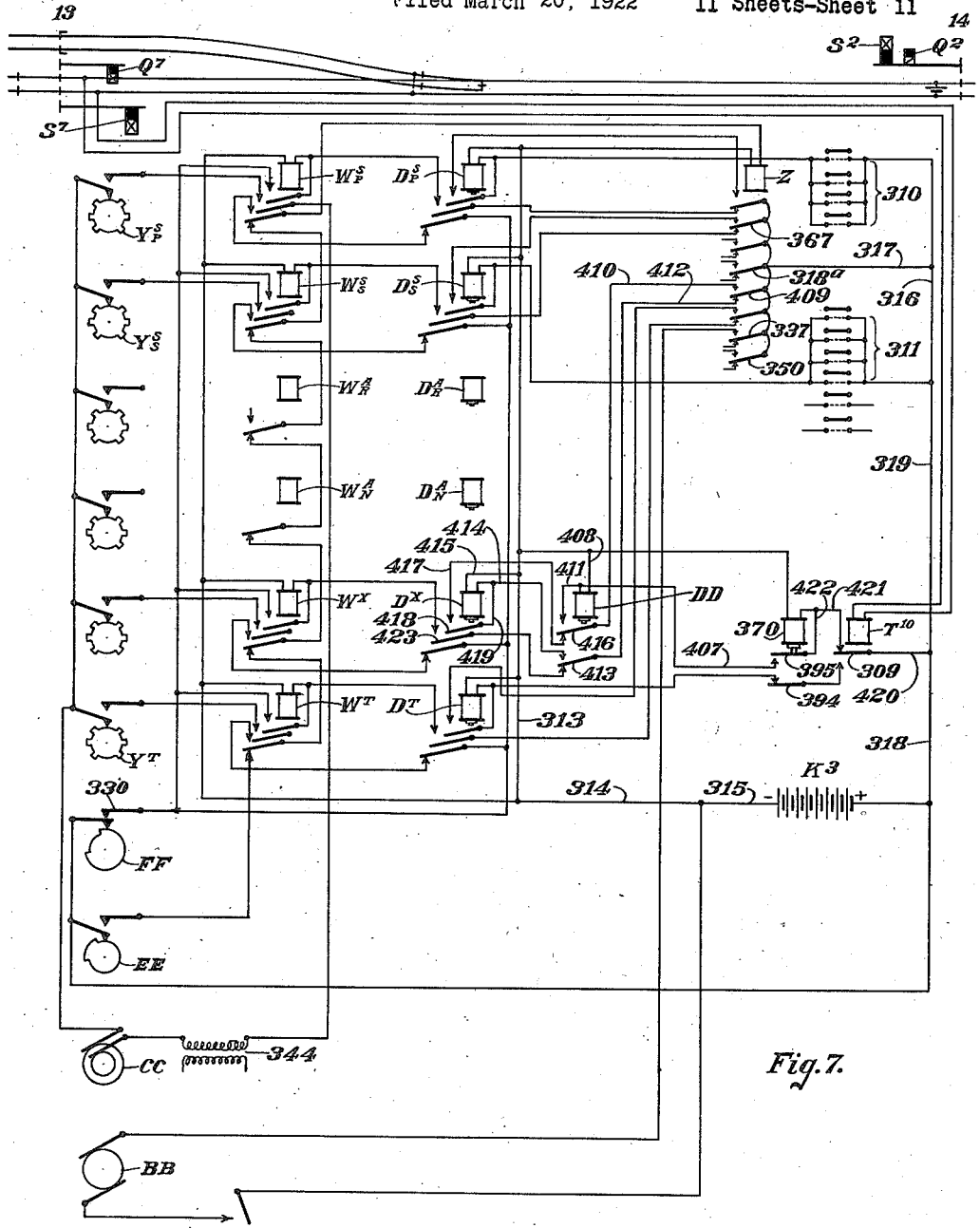

In the accompanying drawings, Figs. 1$^a$, 1$^b$ and 1$^c$, are diagrammatic views, which, when placed end-to-end in the order named, illustrate one form of controlling apparatus embodying my invention, and which views will be hereinafter referred to collectively as Fig. 1. Figs 2$^a$, 2$^b$ and 2$^c$ are diagrammatic views, which, when placed end-to-end in the order named, illustrate another form of controlling apparatus also embodying my invention, and which views will be hereinafter referred to collectively as Fig. 2. Fig. 3 is a diagrammatic view showing one form of indication apparatus embodying my invention and one form of selector controlling apparatus also embodying my invention, both of which are adapted for use in connection with the controlling apparatus of either Fig. 1 or Fig. 2. Fig. 4 is a view showing one form of device which may be employed in connection with the indication transmitting apparatus shown in Fig. 3 for operating the indication contacts 310, 311, 312 and 313. Fig. 5 is fragmentary diagrammatic view showing a modified arrangement of the control circuit for relay F$^4$ shown in Figs. 1 and 2. Fig. 6 is a view showing one way of substituting a plurality of single-point selectors for each multiple-point selector shown in Figs. 1 and 2. Fig. 7 is a view showing a modification of the indication transmitting apparatus illustrated in Fig. 3.

Similar reference characters refer to similar parts in each of the several views.

Figure 14:
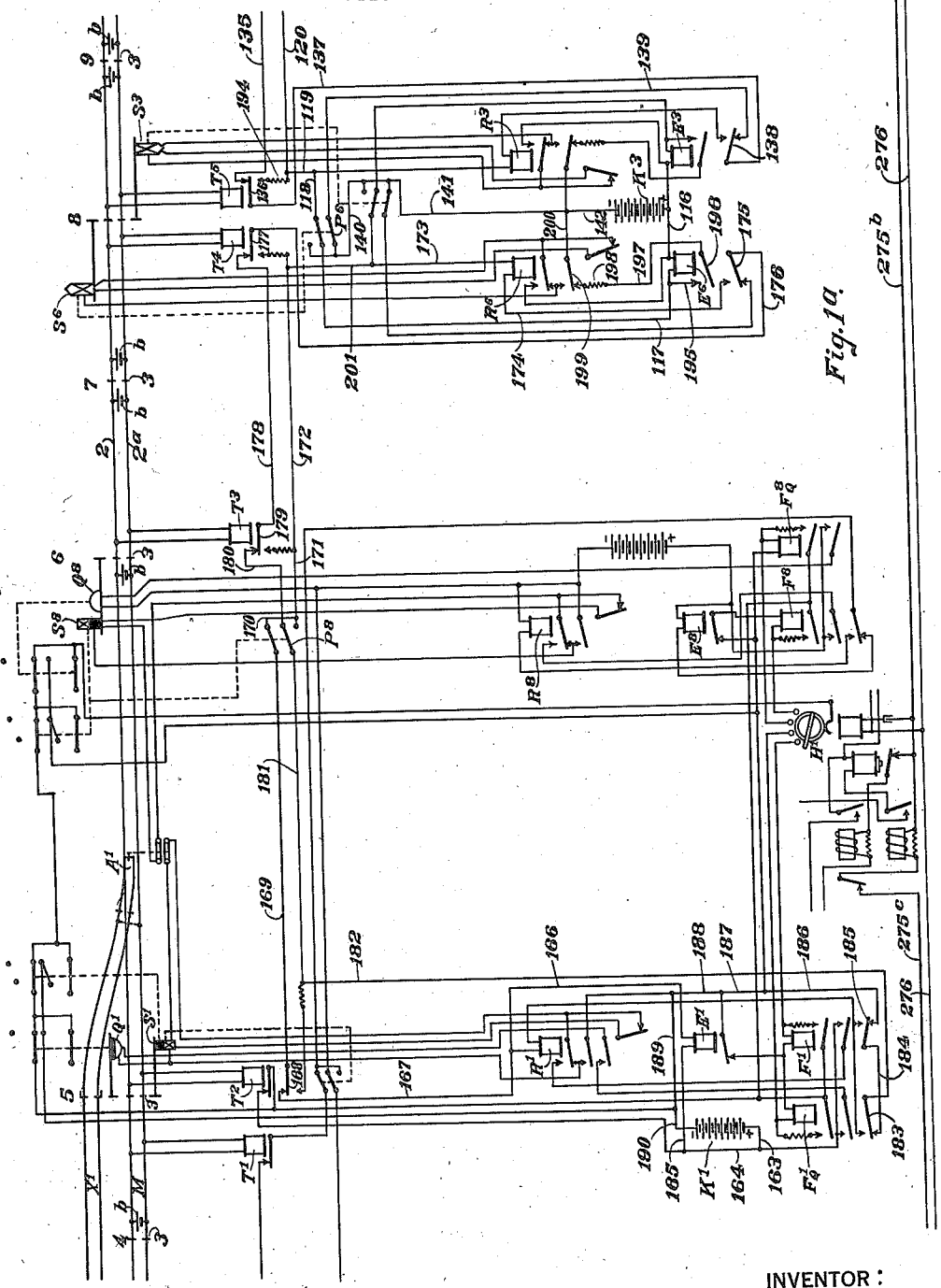
Figure 1C:
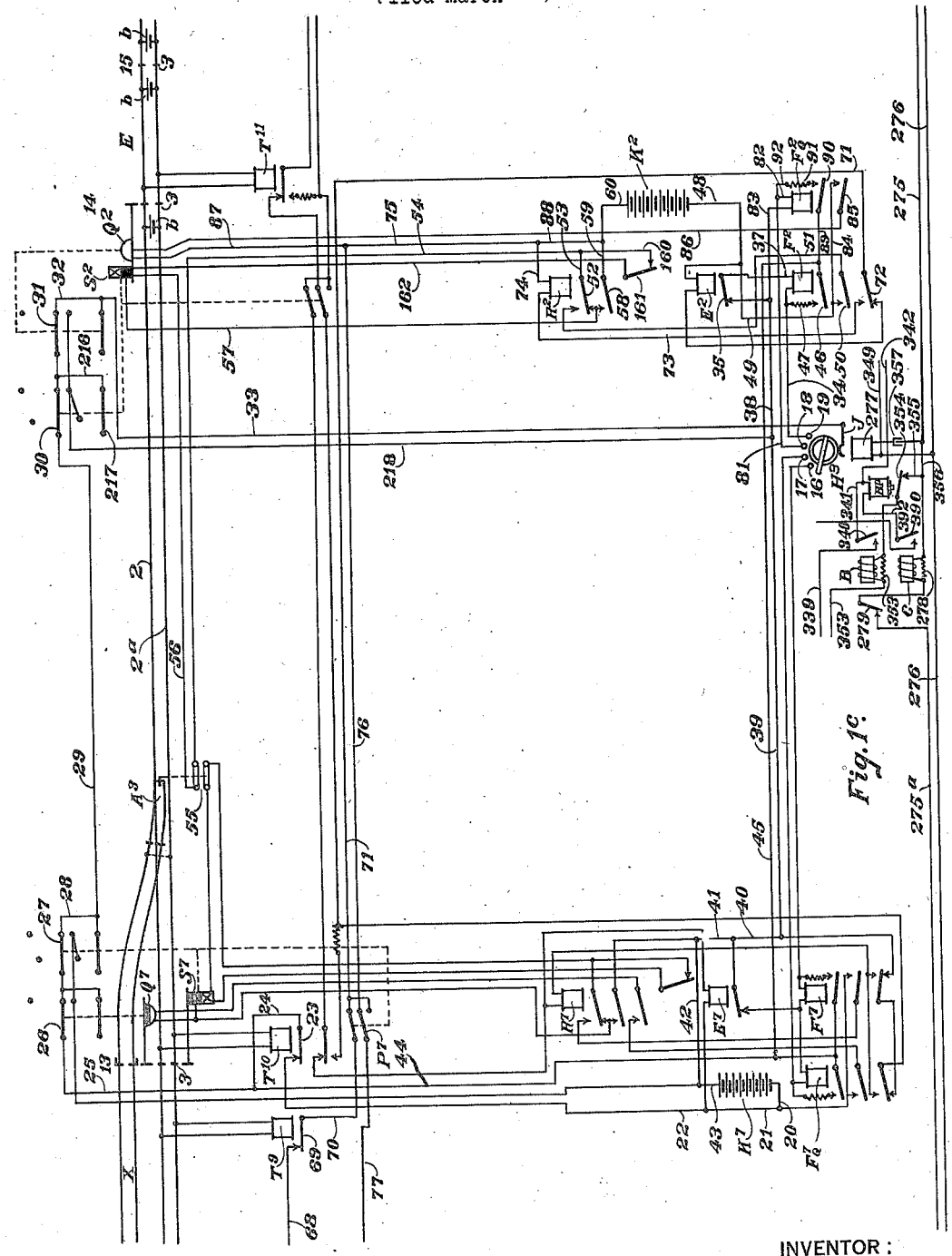
Figure 2C:
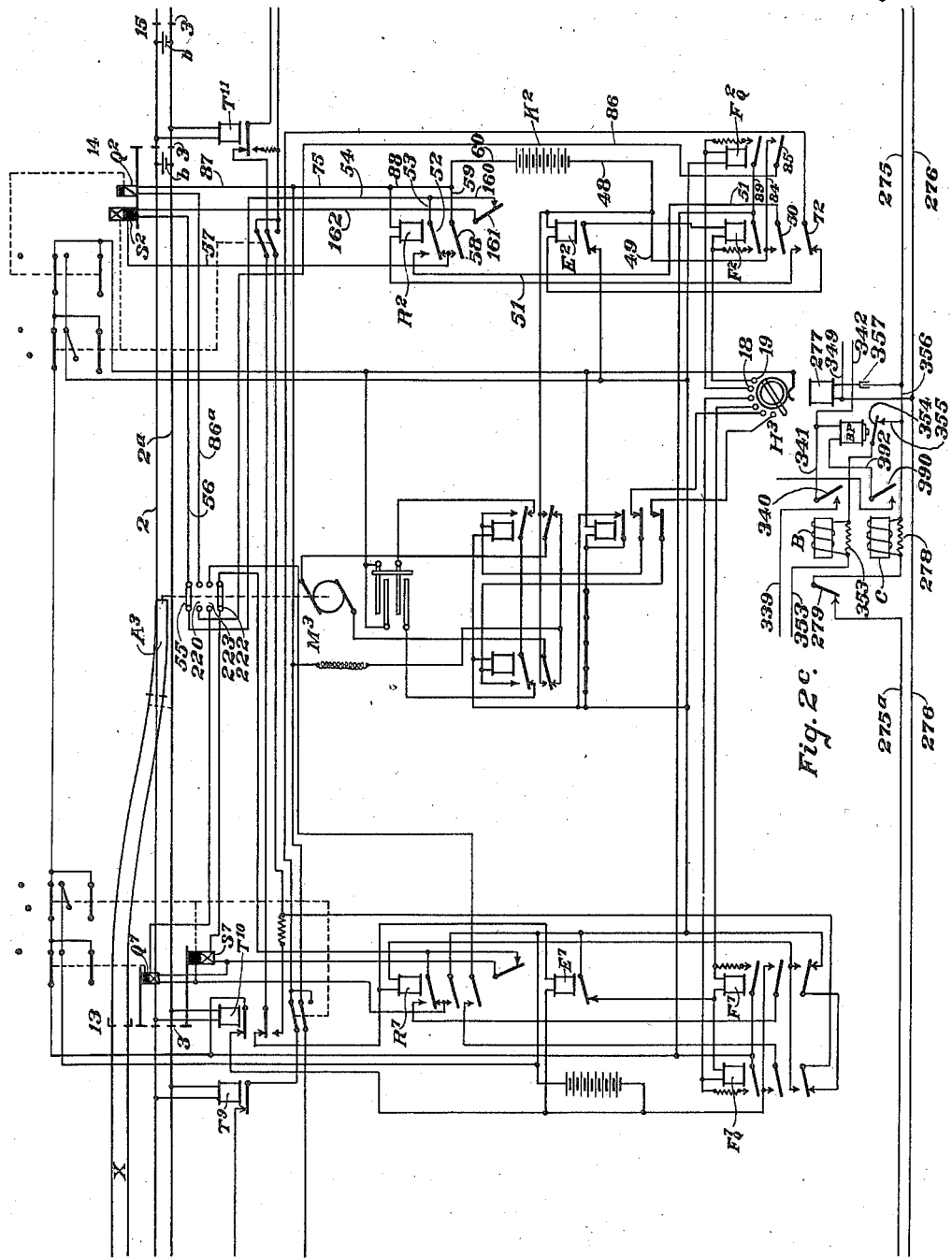

Referring first to Fig. 1, the reference characters 2 and 2$^a$ designate the track rails of a single track over which traffic moves in both directions, and which track is provided as usual with passing sidings X, X', etc. located at suitable intervals and connected with the main track by switches A.

Traffic moving towards the right through the portion of track shown in the drawing is governed by a series of signals S', S$^3$, S$^5$, and S$^7$, while traffic moving towards the left is governed by a series of signals S$^2$, S$^4$, S$^6$, and S$^8$. In addition to these signals, the left-hand end of the siding X is provided with a "take-siding" signal Q$^5$ and a "leave-siding" signal Q$^4$, while the right-hand end of this siding is provided with similar take-siding and leave-siding signals Q$^2$ and Q$^7$. The right-hand end of siding X' is provided with a take-siding signal Q$^8$ and a leave-siding signal Q'. When signal Q$^5$ is in normal position, a train moving towards the right will proceed past the siding X on the main track under the control of signal S$^5$, but when signal Q$^5$ is in the operated position the switch A$^2$ will be reversed by the train crew or otherwise and the train will then enter the siding X. Having thus entered the siding, the train will stop and remain on the siding if the leave-siding signal Q$^7$ is in normal position, and will leave the siding only when such signal is moved to its operated position, whereupon the train will proceed through switch A$^3$ and into the stretch of single track. The functions of the remaining take-siding and leave-siding signals are the same as those of signals Q$^5$ and Q$^7$.

The track rails 2 and 2$^a$ are divided by insulated joints 3 to form a series of electrically isolated track sections 4—5, 5—6, . . . 14—15. Each section is provided with a track circuit for the control of the signals and other devices as hereinafter set forth, which circuit comprises as usual the track rails of the section, a source of current $b$ which as here shown is a battery, and a track relay designated by the reference character T with a suitable exponent.

Each signal S is directly controlled by a translating device which as here shown is a line relay designated by the reference character R with the same exponent as that applied to the signal. Each signal is further controlled by a relay designated E with the same exponent as that applied to the corresponding signal, and certain of the signals are further controlled by additional relays each of which is designated by the reference character F with a suitable exponent to indicate the associated signal. In the arrangement shown in Fig. 1, each signal governing traffic into and out of a siding is provided with an individual F relay.

The signals are controlled, in part at least, from a central point which is usually the office of a train despatcher from which office each signal can be placed at proceed or at stop at the will of the operator, dependent only upon the conditions of traffic in the portion of track which is governed by the signal. This control is effected by selectors located at intervals along the track, each of which is designated by the reference character H with an exponent corresponding to the location. As here shown, one such selector is located at each end of each passing siding, but this particular location and arrangement of selectors may be varied to suit the conditions met with in each installation. These selectors are controlled in any suitable manner from the despatcher's office through the medium of a pair of line wires 275, 276. Each selector in the form here shown comprises four contacts J—16, J—17, J—18, and J—19, all of which are normally open. For purposes of the present invention it is sufficient to state that any contact in any selector can be closed for any short interval of time by the manipulation of the proper key or other controlling element in the despatcher's office. One form of apparatus for the control of the selectors in this manner is illustrated in Fig. 3 and will be explained hereinafter.

As here shown, all signals are normally at stop, and in the absence of trains and of control from the despatcher's office, all parts of the apparatus are in the conditions in which they are shown in the drawings.

I will now assume that the despatcher desires to move signal $S^2$ to a proceed position in order to permit a train moving toward the left to pass this signal. To do this the despatcher operates the proper key or other element to cause selector $H^3$ to close contact J—19. The closure of this contact closes a pick-up circuit for relay $F^2$, which circuit passes from battery $K^7$, through wires 20, 21 and 22, contact 23 of track relay $T^{10}$, wires 24 and 25, contacts 26 and 27, wires 28 and 29, contacts 30 and 31, wires 32 and 33, selector contact J—19, wire 34, winding of relay $F^2$, wire 37, back contact 35 of relay $E^2$, wires 38, 39, 40, 41, 42 and 43 to battery $K^7$. Contacts 26 and 27 are operated by signal $Q^7$ and signal $S^7$, respectively, in such manner that contact 26 is closed only when signal $Q^7$ is in its normal position and contact 27 is closed only when signal $S^7$ is in the stop position, whereas contacts 30 and 31 are operated by signals $S^2$ and $Q^2$, respectively, in such manner that they are closed only when these signals indicate stop and normal, respectively. And so it will be seen that relay $F^2$ cannot be closed unless signals $S^2$ and $S^7$ are at stop and signals $Q^2$ and $Q^7$ are in normal positions. Inasmuch as the circuit for relay $F^2$ is controlled by contact 23 of track relay $T^{10}$, it is obvious that relay $F^2$ cannot be closed if section 13—14 is occupied by a car or train. It will also be observed that the pick-up circuit for relay $F^2$ includes a back contact 35 of a relay $E^2$. As will appear hereinafter, relay $E^2$ is energized when signal $S^5$ is in caution or proceed position, and inasmuch as contact 35 is then open it follows that relay $F^2$ can be energized to operate signal $S^2$ only if the opposing signal $S^5$ is at stop. Selector contact J—19 remains closed for only a short period of time, but as soon as relay $F^2$ closes, a stick circuit for this relay is closed by virtue of which the relay remains closed after the selector contact opens. The stick circuit is from battery $K^7$, through wires 20, 21 and 22, track relay contact 23, wires 24, 44 and 45, contact 46 of relay $F^2$, resistance 47, winding of relay $F^2$, wire 37, back contact 35 of relay $E^2$, and wires 38, 39, 40, 41, 42 and 43 to battery $K^7$. When once closed, therefore, relay $F^2$ will remain closed until track relay $T^{10}$ opens or signal $S^5$ indicates caution or proceed. The closing of relay $F^2$ closes a circuit for line relay $R^2$, which circuit passes from battery $K^5$, through wires 61 and 62, winding of relay $E^5$, wire 63, back point of contact 64 of relay $F^5$, wire 65, pole-changer $P^4$ operated by signal $S^4$, wire 66, contact 67 of track relay $T^8$, wire 68, contact 69 of track relay $T^9$, wire 70, pole changer $P^7$ operated by signal $S^7$, wire 71, front point of contact 72 of relay $F^2$, wire 73, winding of line relay $R^2$, wires 74, 75 and 76, pole-changer $P^7$, wire 77, pole-changer $P^4$, and wires 78, 79, 79ᵃ and 80 to battery $K^5$. Relay $R^2$ will thus become energized, but with signal $S^4$ in the stop position as shown, pole-changer $P^4$ is in such position that the polarized contact 161 of this relay does not close. A caution operating circuit for signal $S^2$ is then closed which passes from battery $K^2$, through wires 48 and 49, contact 50 of relay $F^2$, wire 51, front point of contact 52 of relay $R^2$, wires 53 and 54, contact 55 operated by switch $A^3$ and closed only when the switch is in normal position, wire 56, operating mechanism of signal $S^2$, wire 57, front point of contact 58 of relay $R^2$, wires 59 and 60, to battery $K^2$. Signal $S^2$ then moves to the caution position, but as soon as a train moving toward the left passes this signal, the signal will be restored to the stop position due to the opening of track relay $T^{10}$, which opens relay $F^2$ and which in turn opens the circuit for relay $R^2$.

It will be observed that when relay $R^2$ became energized, relay $E^5$ was energized simultaneously, thus opening the pick-up circuit for relay $F^5$ at the back contact 35 of relay $E^5$. It follows that after signal $S^2$ has been cleared, if the dispatcher attempts to clear signal $S^5$ by closing contact J—16 of selector $H^2$, the attempt will be unsuccessful because neither relay $F^5$ nor $R^5$ can be energized, and so the mistake will produce no operation of any signaling unit.

Signal $S^2$ is cleared when the approaching train is to proceed past the siding X on the main track. On the other hand, if the despatcher desires that this train shall take the siding track X, he takes the necessary steps to operate the take-siding signal $Q^2$. This is done by manipulating the proper key to cause selector $H^3$ to close its contact J—18. A pick-up circuit for relay $F^2_Q$ is then closed, which circuit passes from battery $K^7$, through wires 20, 21 and 22, track relay contact 23, wires 24 and 25, contacts 26 and 27, wires 28 and 29, contacts 30 and 31, wires 32 and 33, selector contact J—18, wires 81 and 82, winding of relay $F^2_Q$, wires 83, 38, 39, 40, 41, 42 and 43 to battery $K^7$. The closing of relay $F^2_Q$ closes a holding circuit for this relay, which circuit passes from battery $K^7$, through wires 20, 21 and 22, contact 23, wires 24, 44, 45 and 89, contact 90 of relay $F^2_Q$, resistance 91, wires 92 and 82, winding of relay $F^2_Q$, wires 83, 38, 39, 40, 41, 42 and 43 to battery $K^7$. Relay $F^2_Q$ remains closed, therefore, after the selector contact opens, and until track relay $T^{10}$ is opened. The closing of relay $F^2_Q$ closes the operating circuit for signal $Q^2$, which circuit passes from battery $K^2$, through wires 48, 49 and 84, contact 85 of relay $F_Q^2$, wire 86, operating mechanism of signal $Q^2$, and wires 87, 75, 88, and 60, to battery $K^2$. The closing of this circuit causes signal $Q^2$ to move to its operated position and it then indicates to the engineer that he is to take the side track of siding X.

I will now assume that the train despatcher desires to clear signal $S^4$. To do this he manipulates the proper key to close contact J—19 in selector $H^2$, and this contact in turn closes a pick-up circuit for relay $F^4$, which circuit passes from battery $K^4$, through wires 93, 94, and 95, contact 96 of track relay $T^7$, wires 97 and 98, contacts 99 and 100, wires 101 and 102, contacts 103 and 104, wires 105 and 106, selector contact J—19, wires 107 and 108, winding of relay $F^4$, wires 109 and 110, back contact 111 of relay $E^4$, and wires 112, 113, 114, and 115, to battery $K^4$. As soon as relay $F^4$ closes, a stick circuit for this relay is closed, which circuit passes from battery $K^4$, through wires 93, 94, and 95, track relay contact 96, wires 97, 143, 144 and 145, contact 146 of relay $F^4$, resistance 147, wire 108, winding of relay $F^4$, wires 109 and 110, back contact 111 of relay $E^4$, and wires 112, 113, 114, and 115 to battery $K^4$. Relay $F^4$ remains closed, therefore, after selector contact J—19 opens and until track relay $T^7$ is opened by a train entering section 10—11. The closing of relay $F^4$ closes a circuit for line relay $R^4$, which circuit passes from battery $K^3$, through wire 116, winding of relay $E^6$, wire 117, pole-changer $P^6$, wires 118, 119, 120, 121, and 122, pole-changer $P^5$, wire 123, front point of contact 124 of track relay $T^7$, wires 125 and 126, winding of relay $R^4$, wire 127, front point of contact 128 of relay $F^4$, wire 129, back point of contact 130 of relay $F^4_Q$, wires 131 and 132, pole-changer $P^5$, wire 133, contact 134 of track relay $T^6$, wire 135, contact 136 of track relay $T^5$, wire 137, back point of contact 138 of relay $E^3$, wire 139, pole-changer $P^6$, and wires 140, 141 and 142 to battery $K^3$. This circuit will be closed, as will be noted, only provided that track relays $T^5$, $T^6$ and $T^7$ are closed. The closing of relay $R^4$ closes a caution operating circuit for signal $S^4$, which circuit is from battery $K^4$, through wires 93, 148 and 149, contact 150 of relay $F^4$, wire 151, front point of contact 152 of relay $R^4$, wires 153 and 154, contact 155 operated by switch $A^2$, wire 156, operating mechanism of signal $S^4$, wire 157, front point of contact 158, and wires 159, 114 and 115 to battery $K^4$. This circuit being closed, signal $S^4$ moves to the caution position, but will not move to the proceed position until pole-changer $P^6$ is reversed, that is, until signal $S^6$ moves away from the stop position, because until such time, relay $R^4$ is energized in such direction that its polar contact 202 remains open. The movement of signal $S^4$ to the caution position reverses pole-changer $P^4$, however, so that the polar contact 161 of relay $R^2$ closes if signal $S^2$ has been moved to the caution position or is subsequently moved thereto, and this signal will then continue to the proceed position because its proceed operating circuit is then closed. This circuit is from battery $K^2$, through wires 48 and 49, contact 50, wire 51, contact 52, wires 53 and 160, polar contact 161 of relay $R^2$, wire 162, operating mechanism of signal $S^2$, wire 57, contact 58, and wires 59 and 60 to battery $K^2$.

It will be noted that relay $E^6$ becomes closed simultaneously with the closing of relay $R^4$. The closing of relay $E^6$ causes relay $R^6$ to become energized through a circuit which passes from battery $K'$, through wires 163, 164, and 165, relay $E'$, wires 166 and 167, front point of contact 168 of track relay $T^2$, wire 169, pole-changer $P^8$, wires 170, 171, 172, 201 and 173, winding of relay $R^6$, wire 174, front point of contact 175 of relay $E^6$, wire 176, front point of contact 177 of track relay $T^4$, wire 178, front point of contact 179 of track relay $T^3$, wire 180, pole-changer $P^8$, wires 181 and 182, back point of contact 183 of relay $F'Q$, wire 184, back point of contact 185 of relay $F'$, and wires 186, 187, 188, 189 and 190 to battery $K'$. Owing to the fact that signal $S^8$ is in the stop position, pole-changer $P^8$ is in such position that the polarized contact of relay $R^6$ is not closed, and so signal $S^6$ moves only to the caution position. The caution and proceed operating circuits for this signal will be obvious from the drawing, and are in accordance with standard practice. The movement of signal $S^6$ to the caution position causes reversal of pole-changer $P^6$, thereby reversing the polarity of the current supplied to relay $R^4$ so that contact 202 of this relay closes and signal $S^4$ moves to the proceed position by virtue of its proceed operating circuit which is in accordance with standard practice and will be obvious from the drawing.

As soon as a train moving toward the left passes signal $S^4$ it opens track relay $T^7$, thereby opening the circuits for relays $F^4$ and $R^4$, so that signal $S^4$ returns to the stop position. Relay $E^6$ must be kept closed, however, in order to keep signal $S^6$ in the caution or proceed position, and for this purpose the circuit for relay $E^6$ is provided with a branch around relay $R^4$ and contact 128 of relay $F^4$, which branch is closed only when track relay $T^7$ is open. This branch passes from wire 123, through the back point of contact 124 of relay $T^7$, wire 191, and resistance 192 to wire 132. As the train enters section 9—10, it opens track relay $T^6$, whereupon another branch for the circuit of relay $E^6$ is closed, which branch passes from wire 135, through the back point of contact 134 of track relay $T^6$, and resistance 193 to wire 120. It follows that relay $R^6$ remains closed while the train is in section 9—10. As the train enters section 8—9, it opens track relay $T^5$, and this in turn closes a third branch in the circuit for relay $E^6$, which branch passes from wire 119, through resistance 194 and the back point of contact 136 of track relay $T^5$ to wire 137. It follows that signal $S^6$ remains in the caution or proceed position until it is actually reached by the train moving toward the left.

As soon as the train passes signal $S^6$, the opening of track relay $T^4$ opens the circuit for relay $R^6$, so that signal $S^6$ returns to the stop position. This operation of relay $R^6$ closes a stick circuit for relay $E^6$, which circuit passes from battery $K^3$, through wire 116, winding of relay $E^6$, wire 195, contact 196, wire 197, resistance 198, back point of contact 199 of relay $R^6$ and wires 200 and 142 to battery $K^3$. By virtue of this stick circuit relay $E^6$ is kept closed as long as relay $R^6$ remains open, and relay $R^6$ of course remains open until the train passes point 5. When the rear end of the train leaves section 5—6, relay $R^6$ closes because relay $E^6$ is closed, but this opens the stick circuit for relay $E^6$ and so the latter relay opens. The opening of relay $E^6$ opens in turn the circuit for relay $R^6$ so that the latter relay opens again, and the circuits for $R^6$ and $E^6$ are then restored to the conditions in which they are shown in the drawing.

The reason for keeping relay $E^6$ closed while a train is between signals $S^6$ and $S'$ is to permit signal $S^4$ or $Q^4$ to be cleared and so to permit a following train to approach signal $S^6$.

After any signal has been moved to an operated position and before it has been accepted by a train, it may be desirable to restore it to the stop or normal position. A number of different means may be provided for accomplishing this. As here shown it is done by the re-closing of the selector contact which caused the operation of such signal. Considering signal $S^2$ for example, and assuming that this signal has been moved to the proceed position, it may be restored to the stop position by closing contact J—19 of selector $H^3$. This closes a shunt path for relay $F^2$, which path passes from the left-hand terminal of such relay through wire 34, contact J—19, wires 33 and 32, contact 31, wire 216, contact 217 (which is now closed), wires 218 and 38, contact 35, and wire 37 to the right-hand terminal of relay $F^2$. Resistance 47 which is included in the holding circuit for relay $F^2$ functions in this operation by facilitating the shunting of the relay. The shunting of each of the remaining relays F is similar to the operation just explained for relay $F^2$ and will be understood without further discussion.

While I have herein described the apparatus and circuits for the arrangement of traffic controlling devices shown in Fig. 1, I do not desire to restrict myself to this particular arrangement of devices, because the invention is applicable to any arrangement which may be desirable, depending upon the specific conditions encountered in each installation. For example, by placing Figs. 1$^c$ and 1$^b$ end to end in the order named, an arrangement is disclosed in which the intermediate automatic signals $S^3$ and $S^6$ of Fig. 1$^a$ are absent. This arrangement of signals will frequently be employed when the distance between passing sidings X is short, or when traffic density is not such as to warrant the expense involved in the installation of such automatic signals. In this, as well as in the following variations, slight circuit changes will be required, but these changes will be obvious. For instance, in the re-arrangement just mentioned, the resistances 192, 193, etc., and the back contacts associated therewith, will be without functions and may, therefore, be omitted. Among the other re-arrangements which may be employed with obvious circuit modifications are the following: Either of the intermediate automatic signals $S^3$ or $S^6$ may be omitted and the other retained; both signals $S^3$ and $S^6$ may be used, but instead of placing them opposite each other, as shown in Fig. 1, they may be staggered, either facing each other or back-to-back, with the necessary track circuits between them. Any number of intermediate automatic signals, such as $S^3$ and $S^6$, may be provided, and may be located in any desired relations to each other; Fig. 1ᶜ may be used as a unit, and this modification will usually occur at the junction of two tracks or at an end of a side track or the end of a double track, when such junction is not in a track included in a continuous system embodying my invention. The circuit modifications for such a unit will depend on the extent of the track circuit control of signals S⁴, Q⁴, S⁵ and Q⁵, and will also depend on whether or not distant signals are provided.

Referring now to Fig. 2, the control of the signals is the same as in Fig. 1 except that the selection between each main signal S and the associated take-siding or leave-siding signal Q is accomplished by the position of the switch A over which such signals govern traffic as well as by the associated relays F. Considering signals S² and Q², for example, this selection by switch position is accomplished by contacts 55 and 220 operated by the switch, the former of which is closed only when the switch is in normal position and the latter of which is closed only when the switch is in reverse position. The circuit for signal S² includes contact 55, and the circuit for signal Q² includes contact 220. When the despatcher desires to clear signal S², he takes the necessary steps to close relay F², whereupon if switch A³ is in normal position and all other traffic conditions are correct, signal S² will clear. The circuit for this signal is the same as the circuit for the corresponding signal in Fig. 1. Similarly, if the despatcher desires to operate signal Q² he takes the necessary steps to close relay F_Q², and signal Q² will then be operated provided switch A³ is in the reverse position. The circuit for signal Q² is the same as in Fig. 1 except that in Fig. 2 the wire 86 is divided into two wires 86 and 86ᵃ with the switch operated contact 220 between them.

Signals S⁷ and Q⁷ are similarly selected by contacts 222 and 223 operated by switch A³. Signals S⁴ and Q⁴ are selected by contacts 224 and 225 operated by switch A². Signals S⁵ and Q⁵ are selected by switch-operated contacts 226 and 227. Signals S⁸ and Q⁸ are selected by contacts 228 and 229 operated by switch A′. Signals S′ and Q′ are selected by contacts 230 and 231. It is believed that the operation of the signal controlling apparatus shown in Fig. 2 will be understood from the foregoing without further explanation.

Each switch A is operated by a motor designated by the reference character M with the same exponent as that applied to the switch, this operation being accomplished through the medium of a suitable mechanism which is not shown in the drawing but which is represented by the dotted line between the motor and the switch.

Considering switch A², for example, the motor M² which operates this switch comprises an armature 247 and a field winding 248. This motor is controlled by a normal relay Vᴺ and a reverse relay Vᴿ, as well as by an auxiliary relay U² the function of which will be hereinafter explained.

The operation of switch A² is as follows:

As shown in the drawing, this switch is in the normal position, and all of the associated parts are in the positions corresponding to this position of the switch. When the despatcher desires to reverse switch A² he operates selector H² in such manner as to close contact J—18ᵃ, thereby closing a circuit for reverse relay Vᴿ, which circuit passes from battery K⁴, through wires 93, 94 and 95, contact 96 of track relay T⁷, wires 97 and 98, signal operated contacts 99 and 100, wires 101 and 102, signal operated contacts 103 and 104, wires 105, 106, 106ᵃ, 106ᵇ, selector contact J—18ᵃ, wire 233, contact 234 of relay U², wire 235, winding of relay Vᴿ, and wires 236, 237, 238, 239, 113, 114 and 115 to battery K⁴. When relay Vᴿ closes, a holding circuit for this relay is closed which is the same as the pick-up circuit up to and including wire 106, from which it passes through wires 240 and 241, contact 260—260ᵃ—260ᵇ, wire 242, back point of contact 243 of relay Vᴺ, wire 244, front point of contact 245 of relay Vᴿ, wire 246, winding of relay Vᴿ, and thence as before to battery K⁴. Contact 260—260ᵃ—260ᵇ is closed at all times except when the switch is locked in full reverse position. Relay Vᴿ being closed, a motor operating circuit is closed which passes from battery K⁵, through wires 61, 62, 249 and 250, front point of contact 251 of relay Vᴿ, wire 252, motor armature 247, wire 253, back point of contact 254 of relay Vᴺ, wires 255 and 257, motor field winding 248, and wires 259, 79, 79ᵃ and 80 to battery K⁵. Motor M² is then energized in such direction as to move switch A² to its reverse position. When this position is reached and the switch is locked, contact 260—260ᵃ—260ᵇ opens so that relay Vᴿ becomes de-energized due to the opening of its holding circuit, and the opening of the front point of contact 251 of relay Vᴿ serves in turn to de-energize motor M².

When the despatcher desires to return the switch A² to its normal position, he operates selector H² to close contact J—17ᵃ, whereupon normal relay Vᴺ becomes energized by virtue of a pick-up circuit which passes from battery K⁴, through the same path as before to the selector H², then through contact J—17ᵃ, wire 267, contact 268 of relay U², wire 269, winding of relay Vᴺ, wire 270, and thence as before through wire 236, etc. to battery K⁴. The closing of this relay closes a holding circuit which is the same as the pick-up circuit up to and including wire 106, from which it passes through wires 240 and 271, contact 260$^c$—260$^a$—260$^d$, wire 272, back point of contact 245 of relay V$^R$, wire 244, front point of contact 243 of relay V$^N$, wire 273, winding of relay V$^N$, and thence through wires 270, 236, etc. to battery K$^4$. With relay V$^N$ closed, a motor operating circuit is closed which passes from battery K$^5$, through wires 61, 62 and 249, front point of contact 254, wire 253, armature 247, wire 252, back point of contact 251, wires 256 and 257, field winding 248 and wires 259, 79, 79$^a$ and 80 to battery K$^5$. Current in this circuit energizes the motor M$^2$ in such direction as to return the switch A$^2$ to its normal position; when this position is reached and the switch is locked, contact 260$^c$—260$^a$—260$^d$ opens, thereby opening the holding circuit for relay V$^N$, and the opening of the front point of contact 254 of this relay de-energizes the circuit for motor M$^2$.

Relay U$^2$ is provided with a pick-up circuit which passes from battery K$^4$, through wires 93, 94 and 95, track relay contact 96, wires 97 and 98, signal contacts 99 and 100, wires 101 and 102, signal contacts 103 and 104, wires 105, 106, 106$^a$ and 261, relay U$^2$, wire 262, signal-controlled contacts Z', Z$^2$, Z$^3$, Z$^4$, and wires 237, 238, 239, 113, 114 and 115 to battery K$^4$. After relay U$^2$ becomes closed it is held closed by a stick circuit which eliminates the contacts Z in that it passes from wire 261, through relay U$^2$, wire 263, contact 264, and wire 265, to wire 237.

The function of relay U$^2$ is to prevent operation of switch A$^2$ at such times as such operation would be undesirable. As here shown, this relay is controlled only by the signals immediately governing traffic over the switch, but other means may be employed if desired for controlling the relay. The switch can be moved only when relay U$^2$ is closed. This relay is normally closed, but will be opened by the movement of any one of the four signals S$^5$, Q$^5$, S$^4$, Q$^4$, away from stop position, and when all four signals have again assumed the stop position the relay can be closed only when contacts Z are all closed. These contacts are preferably governed by time element devices which in turn are operated by the four signals respectively, and the operation is preferably such that each contact is opened when the corresponding signal moves away from the stop position and will not be closed until a predetermined time has elapsed after the signal returns to the stop position. One form of time element device which may be used for this purpose is illustrated in Figs. 2 and 2$^a$ of United States Letters Patent granted to John V. Young on the 13th day of January, 1920, No. 1,328,070. Other uses for the U relays are well known in the art, and need not be explained herein.

In the systems shown in Figs. 1 and 2, each selector H is provided with a plurality of contacts, any one of which may be closed, by proper control from a distant point, for a period of time sufficient to energize the relay which is governed by that contact. As far as I am aware, commercial selectors of the present day are so constructed that when the wiper moves from its off position to any contact point other than the first, it makes a momentary engagement with the first point and each other intermediate point. Such momentary engagement is of very short duration, and is probably not long enough to effectively energize a relay, but if it should be found that improper energization of a relay is apt to occur due to this momentary closing of the intermediate contacts, such improper energization can be prevented in several different ways. One alternative is to make the relays directly controlled by the selectors sluggish in picking up, as for example by increasing the inertia of the armature or by placing a copper sleeve around a portion of the magnetic circuit, or both. Another alternative is to include in the circuit of each relay directly controlled by the selector a device which delays the building up of current in such circuit. One device of this nature is a cell of thermosensitive material having a negative temperature coefficient, such material being for example cupric oxide. In Fig. 5 I have shown a device of this kind associated with relay F$^4$. The circuits for this relay are the same as in Figs. 1 and 2, except that a device 406 having the characteristic just described is inserted in wire 98 so that it is included in the pick-up circuit for relay F$^4$ but not in the holding circuit or in the path for shunting this relay. One reason for placing device 406 in wire 98 is to keep it out of the path which is used for shunting this relay when the despatcher desires to open the relay, and another reason is that when so located one such device will serve for all of the relays directly controlled by each selector H in Figs. 1 and 2. Still another alternative is to substitute a one-point selector for each point of a multiple selector, and this scheme is illustrated in Fig. 6, wherein relays F$^5$, F$_Q^5$, F$_Q^4$ and F$^4$ are controlled by one-point selectors Ha$^{16}$, Ha$^{17}$, Ha$^{18}$ and Ha$^{19}$, respectively. The controlling magnets 277 of these selectors are connected in multiple across line wires 275$^a$, 276, so that the operation is the same as that of the structure shown in Fig. 2$^b$.

Referring now to Fig. 3, I have here shown one form of apparatus for controlling the selectors H, together with one form of apparatus for indicating in the despatcher's office the operation of the traffic governing devices controlled by these selectors as well as the operation of certain of the track relays.

Considering first the control of the selectors, it will be observed that when contact 279 at each selector location is closed the operating magnet 277 of each selector is connected across the line wires 275 and 276 so that these magnets are in multiple. The reason for relays C, resistances 278, and contacts 279 in the selector circuits will be explained hereinafter, it being sufficient to say at the present time that these elements do not function in any way in the control of the selectors.

Figure 3C:
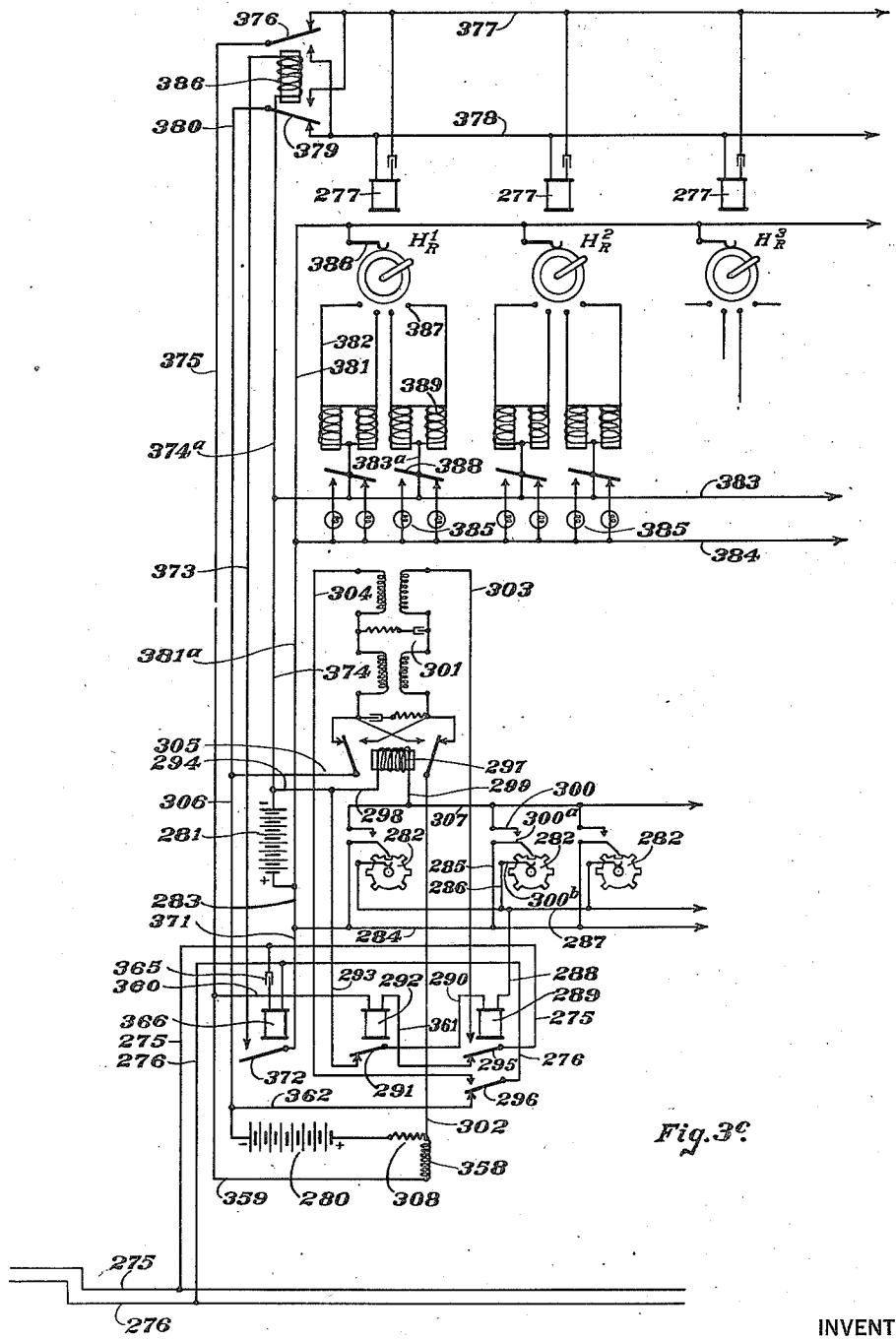

The selectors H are controlled by pulsations of electric current, each contact being closed only in response to a definite arrangement of pulsations which is known as the "code" or "code signal" of such contact. These code signals may be effected by a separate contacting device, known as a code key, for each code signal, or by a master key capable of giving any code signal and provided with means for selecting any desired code signal and causing the impulses of such signal to be completed. As here shown, the selectors are controlled by a number of code keys 282 (Fig. 3c). When the despatcher wishes to operate a switch or a signal, he sets into operation the proper code key for the desired contact of the desired selector, and as soon as the code key starts, relay 289 becomes closed. Assuming that the middle key 282 is operated, the circuit for relay 289 passes from battery 281, through wires 283, 284 and 285, contact 300ª—300ᵇ of the middle code key 282, wires 286, 287 and 288, winding of relay 289, wire 290, back contact 291 of relay 292, and wires 293 and 294 to battery 281. This circuit cannot be closed, of course, if relay 292 is energized, and as will be pointed out hereinafter this latter relay is energized whenever an indication is being received in the despatcher's office. Relay 289 being once closed, remains closed during the entire operation of the code key, because the recesses between the teeth of the code key are not deep enough to permit contact 300ª—300ᵇ to open. The recess which is under contact finger 300ª when the key is in normal position is deeper, however, and sufficiently so to cause relay 289 to be normally deenergized. One function of relay 289, as will hereinafter appear, is to prevent the transmission of an indication while an operating signal is being sent out, and this is accomplished by including a back contact of relay 289 in the indication circuit. The operation of the code key causes intermittent energization of magnet 297 because of a circuit which passes from battery 281, through wires 283, 284 and 285, contact 300ª—300 of the middle key 282, wires 307 and 299, winding of magnet 297, and wires 298 and 294 to battery 281. Impulses are then sent to the selectors H from the main battery 280, the circuit being from the right-hand terminal of this battery, through resistance 308, wire 302, contacts, windings, etc., of a transmitting device 301, wire 303, front point of contact 295 of relay 289, wire 275, condenser 357, magnet 277 of each selector H, wire 276, front point of contact 296 of relay 289, wire 304, windings and contacts of the transmitting device 301, and wires 305 and 306 to the left-hand terminal of the main battery 280. Impulses are thus transmitted to each selector H and to each relay C, but only the one selector which is called advances to close a contact. The function of the relay C will be explained hereinafter in connection with the transmission of indications from the traffic controlling devices to the despatcher's office.

The structure and operation of the indication transmitting apparatus are as follows:

Considering the traffic governing devices controlled by selector H³, the indication that a train has entered track section 13—14 is controlled by a contact 309 of track relay T¹⁰. The indication that switch A³ has moved to the reverse position is controlled by a contact 312 which is momentarily closed by the switch operating mechanism after the switch reaches the reverse position and just before the operating mechanism completes the function of locking the switch, while the indication that this switch has moved to the normal position is controlled by a contact 313 which is momentarily closed after the switch reaches the normal position and just before the operating mechanism completes the function of locking the switch in this position. The signal indications are controlled by two groups of contacts 310 and 311. Group 310 comprises four contacts operated by signals S⁷, Q⁷, S² and Q², respectively, in such manner that each contact is momentarily closed just before the signal by which it is operated reaches the caution position in the case of the S signals and the operated position in the case of the Q signals. Similarly, group 311 comprises four contacts operated by the same four signals respectively and each of which is momentarily closed just before the corresponding signal reaches the stop position. One form of apparatus which may be employed for operating contacts 310, 311, 312 and 313 will be described hereinafter. Each indication controlling contact 310, 311, 312, 313 controls an associated relay D, and each relay D controls an associated relay W, as hereinafter explained.

The indication apparatus comprises a motor BB which drives a shaft carrying an alternating current generator CC, two cam disks EE and FF, and a plurality of toothed disks Y one for each relay W. The equipment shown in the drawing is sufficient for six separate indications at each location, but one toothed disk Y, one relay W and one relay D can be eliminated for each indication eliminated, or added for each indication added.

To explain the operation of the indication transmitting apparatus, I will assume that switch $A^3$ is moved from reverse to normal position. Just before the switch becomes fully locked in the normal position, contact 313 is momentarily closed, thereby picking up relay $D^A{}_N$ by means of a circuit which passes from battery $K^3$, through wires 318 and 319, contact 313, wire 310, winding of relay $D^A{}_N$, and wires 312, 313, 314 and 315 to battery $K^3$. Relay $D^A{}_N$ is closed for a short interval only, but while it is closed it closes a pick-up circuit for relay $W^A{}_N$, which circuit passes from battery $K^3$, through wires 318, 319, 316 and 317, back point of contact 318$^a$ of relay Z, wire 319$^a$, contact 320 of relay $D^A{}_N$, wire 321, winding of relay $W^A{}_N$, and wires 322, 323, 314 and 315 to battery $K^3$. The closing of relay $W^A{}_N$ closes a stick circuit for this relay which passes from battery $K^3$, through wires 324 and 325, contact 330 operated by cam disk FF, wires 326 and 327, contact 328, wire 329, winding of relay $W^A{}_N$, and wires 322, 323, 314 and 315 to battery $K^3$. The closing of relay $W^A{}_N$ energizes relay Z, through a circuit which passes from battery $K^3$, through wires 324 and 325, contact 330, wires 364 and 331, back contact 332 of relay $D^A{}_N$, wire 333, front point of contact 334 of relay $W^A{}_N$, thence through the lower back contacts of relays $W^A{}_R$, $W^S{}_S$ and $W^S{}_P$, wire 335, winding of relay Z, and wires 336, 313, 314 and 315 to battery $K^3$. The closing of relay Z closes a circuit for relay B which passes from battery 280 (in the despatcher's office) through resistance 308, impedance 358, wires 359 and 360, winding of relay 292, wire 361, back point of contact 295 of relay 289, wire 275, wires 356 and 355, back contact 354 of relay $B^P$, winding of relay B and resistance 353 in multiple, wire 352, secondary of a transformer 344, wire 351, contact 350 of relay Z, wires 349 and 276, back point of contact 296 of relay 289, and wire 362 to battery 280. Current in this circuit is choked out of magnet 277 of selector $H^3$ by a condenser 357, and so the most it can do is to cause the selector to move one step due to a single pulsation when the circuit becomes closed; the selector will then return to normal position at once because a second pulsation will not occur. This current does energize relay B, however, thereby opening contact 279 and closing contact 340 of this relay. Relay Z and contact 340 both being closed, motor BB is operated by a circuit which passes from battery $K^3$, through wires 318, 319, 316 and 317, contact 337 of relay Z, wire 338, motor BB, wire 339, contact 340, and wires 341, 342 and 315 to battery $K^3$. Motor BB then drives each of the devices connected therewith, including the alternating current generator CC and the toothed wheel $Y^A{}_N$, so that current from the generator is supplied to the primary of transformer 344 by a circuit which passes from the generator CC, through wire 348, contact 393 operated by wheel $Y^A{}_N$, wire 347, contact 346 of relay $W^A{}_N$, wire 345, primary of transformer 344, and wire 343 to generator CC. The supply of current to transformer 344 is intermittent, depending on the configuration of the toothed wheel $Y^A{}_N$, and corresponding intermittent impulses of alternating current are supplied to the line wires 275 and 276 by the secondary of transformer 344, the circuit being from the left-hand terminal of this secondary, through wire 351, contact 350 of relay Z, wires 349 and 349$^a$, line wire 276, winding of relay 366, condenser 365, line wire 275, wires 356 and 355, back contact 354 of relay $B^P$, resistance 353 and winding of relay B in multiple, and wire 352 to the secondary of transformer 344. The indication receiving apparatus controlled by relay 366 in the despatcher's office will be explained hereinafter. After the transmission of the code impulses has been completed, cam disk FF permits contact 330 to open, thereby opening at this point the stick circuit for relay $W^A{}_N$ and the main circuit for relay Z. Relay $W^A{}_N$ opens, but relay Z does not open because previous to the opening of contact 330, contact 331 is closed by cam disk EE, so that relay Z is kept energized by a circuit which passes from battery $K^3$, through wires 324 and 325, contact 331, wire 363, lower back contact of each relay W, wire 335, relay Z, and wires 336, 313, 314 and 315 to battery $K^3$. The operation of motor BB is continued, therefore, until the cam disk EE permits contact 331 to open, whereupon relay Z becomes deenergized, motor BB comes to rest, and the parts of the transmitting apparatus are again in the positions in which they are shown in the drawing It is apparent that a second traffic controlling device may complete an operation and be ready to indicate before the completion of the indication of a previously operated device. For example, when a train passes a proceed signal, the indications "train on track circuit" and "signal at stop" will be so close together that the latter indication may be ready to start before the former is completed. That is, each indication will require an interval of time so that the signal may reach the stop position before the indication that the track relay has opened is completed. Suitable means are provided, therefore, to prevent interference of indications under such a condition. Assuming, for example, that signal $S^4$ is in the proceed position and is accepted by a train, the entrance of the train into track section 13—14 will de-energize track relay $T^{10}$. The opening of relay $T^{10}$ closes at back contact 309 the circuit for relay $D^T$ corresponding to the circuit hereinbefore traced for relay $D^A{}_N$. The opening of relay $T^{10}$ also deenergizes a relay 370, the function of which will be explained hereinafter. The closing of relay $D^T$ closes the pick-up circuit for relay $W^T$, which circuit corresponds to the circuit traced hereinbefore for relay $W^A{}_N$, and the indication that a train has entered section 13—14 is then transmitted by toothed wheel $Y^T$ in the same manner as before. Before this indication is completed, however, the contact 311 operated by signal $S^2$ will close momentarily just before this signal reaches the stop position, and this contact operation will momentarily close the circuit for relay $D^s{}_s$ corresponding to the circuit which I have hereinbefore traced in detail for relay $D^A{}_N$. Relay $W^s{}_s$ will not close, however, because its pick-up circuit is open at the back point of contact 367 of relay Z. On the other hand, a stick circuit for relay $D^s{}_s$ is closed, which circuit passes from battery $K^3$, through wires 318, 319, 316 and 317, front point of contact 367, wire 368, contact 369 of relay $D^s{}_s$, winding of relay $D^s{}_s$, and wires 313, 314 and 315, to battery $K^3$. Relay $D^s{}_s$ will remain closed, therefore, until relay Z opens, that is, until after the indication that a train has entered section 13—14 is completed. As soon as relay Z opens the pick-up circuit for relay $W^s{}_s$ is closed, through the back point of contact 367 on relay Z and front contact 369$^a$ of relay $D^s{}_s$, so that the operation of the indication transmitting apparatus is then repeated in order that toothed wheel $Y^s{}_s$ may transmit the code which gives the information at the despatcher's office that signal $S^2$ has assmed the stop position. It will be noted that when relay Z opens, it opens the holding circuit for relay $D^s{}_s$ at the front point of contact 367, and it will also be noted that the pick-up circuit for relay $W^s{}_s$ must be effectively closed before relay $D^s{}_s$ opens. To insure the proper time interval for this operation, it is probably best to make each relay D slow-releasing in character as indicated in the drawing.

Another condition under which indications may be stored, is as follows: Assume that signal $S^2$ is at caution or proceed, that a westbound train is approaching it, that the despatcher clears signal $S^4$, and that the train passes signal $S^2$ before the movement of signal $S^4$ is completed. As the train passes $S^2$ it opens track relay $T^{10}$, and this causes the closing of relay $D^T$, followed by the closing of relay $W^T$, and the opening of relay $D^T$. The movement of signal $S^2$ to the stop position causes relay $D^s{}_s$ to close, but the indication for this signal is stored as hereinbefore explained. The closing of relay $W^T$ causes relay Z to close, whereupon relay B closes and in so doing it opens at contact 279 the circuit for relay $B^2$ associated with selector $H^2$. Consequently, when the movement of signal $S^4$ is completed, relays $W^s{}_P$ and $Z^2$ associated with this signal will close but the apparatus for transmitting the indication of this movement will remain stationary because the circuit for motor $BB^2$ is open at contact 340 of relay $B^2$. This indication, then, is stored. When the indication that track relay $T^{10}$ has opened is completed, relay Z opens, relay B opens, and the closing of contact 279 permits relays C and $B^2$ to close, so that motor $BB^2$ then operates to transmit the indication that signal $S^4$ has cleared. While this indication is being transmitted, the apparatus at $H^3$ cannot transmit the indication that signal $S^2$ is at stop, because relay C is closed so that relay $B^P$ is closed with the result that relay B is held open. As soon as the indication for signal $S^4$ is completed, relays C and $B^2$ are de-energized, whereupon relay B closes and the apparatus at $H^3$ then proceeds to transmit the indication that signal $S^2$ is at stop. It will thus be seen that, not only is the second indication in any one group of devices stored, but one or two indications in any of several other groups may be stored at the same time.

The first started indication of the group nearest the despatcher's office will be transmitted first, followed by the first started indication of the next farthest group in which indications are stored, and when this is completed the second started indication in the first group will be transmitted. This alternation will continue until all the stored indications in one of these groups have been transmitted, and then the same alternation will occur in the two remaining groups nearest the despatcher's office having indications stored therein.

The function of relay 370 is to co-operate with track relay $T^{10}$ to give one indication when a train enters track section 13—14, and another indication when a train leaves this section. When a train enters the track section, the opening of relay $T^{10}$ opens the circuit for relay 370, which circuit will be obvious from the drawing, but before relay 370 opens, the circuit for relay $D^T$ is closed through the back point of contact 309 of relay $T^{10}$ and contact 394 of relay 370. If found desirable, relay 370 may be made slow-releasing in character to insure that contact 394 and the back point of relay 309 will be closed simultaneously for a long enough period to close relay $D^T$. The remainder of the operation for transmitting an indication that track section 13—14 is occupied corresponds in every respect to the operation traced hereinbefore for indication that switch A³ has moved to its normal position. When the rear end of the train leaves section 13—14, relay T¹⁰ will again close, but before relay 370 closes the circuit for relay D˟ will be momentarily closed through the front point of contact 309 and back contact 395. The closing of relay D˟ initiates the operation of the transmitting apparatus to indicate that the train has left the section, and this operation will be understood without detailed explanation.

The indication receiving apparatus in the despatcher's office is as follows:

Relay 366 is responsive to alternating current, and, consequently, is closed intermittently by the code impulses sent out by the indication transmitting apparatus. This relay controls a relay 386 by virtue of a circuit which passes from battery 281 through wires 283 and 371, contact 372, wire 373, winding of relay 386, and wires 374ᵃ and 374 to battery 281. Relay 386 in turn controls the supply of current to the magnets 277 of a series of receiving selectors H′ᵣ, H²ᵣ, H³ᵣ. The circuit for these magnets is from battery 280, through resistance 308, reactance 358, wires 359 and 375, relay contact 376, wire 377, magnets 277, wire 378, contact 379 and wires 380 and 306 to battery 280. One or another of the selectors Hᵣ is actuated to close one of the contacts of such selector, depending on the code of the signal received by the apparatus. Assuming, for example, that selector H′ᵣ is operated to close contact 386—387, then an indicator magnet 389 will be energized through a circuit which passes from battery 281, through wires 381ᵃ and 381, contact 386—387, magnet 389 and wires 383ᵃ, 383 and 374 to battery 281. Energization of magnet 389 will close contact 388, thereby connecting the corresponding lamp 385 across wires 383 and 384, which wires are in turn connected across the terminals of battery 281. The lamp 385 which is thus illuminated, corresponds to the traffic controlling device which has caused the operation of the selector transmitting apparatus. Contact 388 is not biased, so this lamp will remain illuminated until contact 388 is moved by hand or by the magnet next to the left of magnet 389.

If it is found that the momentarily wiping of the contacts in selectors Hᴿ causes improper energization of magnets 389, the difficulty can be avoided by any of the alternative schemes described hereinbefore in discussing the main selectors H of Figs 1 and 2.

Returning now to the indication transmitting apparatus, it will be noted that while an indication is being transmitted from station H³, contact 279 of relay B at this station is open. This disconnects the apparatus at station H² from the despatcher's office and so prevents operation of selector H² and also prevents an indication being transmitted from station H² to the despatcher's office. Conversely, when station H² is indicating, relay C at station H³ is energized, thereby closing relay Bᴾ at contact 390 and so preventing station H³ from sending an indication until the indication from station H² is completed. The circuit for relay Bᴾ is from battery K³, through wires 324 and 391, contact 390 of relay C, wire 392, winding of relay Bᴾ, and wires 342 and 315 to battery K³.

The function of relay 292 in the despatcher's office is to prevent sending an operating signal over the line while an indication is being received. This relay is in series with relays B and C, and, consequently, it closes as soon as an indication starts. The closing of relay 292 opens the circuit for relay 289 at contact 291, so that it is impossible for the despatcher to transmit a code signal to the selectors H.

Relay Bᴾ performs the further function of preventing the indication motor BB from operating if a W relay becomes closed while a code signal is being transmitted from the despatcher's office. Inasmuch as relay C is energized as soon as the transmission of a signal from the despatcher's office is started, relay Bᴾ picks up at such time, and it remains closed during the entire signal, because it is slow-releasing in character to a sufficient degree to enable it to keep contact 354 open during the longest interval between impulses in any signal. While contact 354 is open, relay B is, of course, held open and the circuit for motor BB is therefore kept open at contact 340.

It may be desirable in some instances to provide an auxiliary visible or audible signal in the despatcher's office to show when an indication is coming in, and so to inform the despatcher that an operation of one of the keys 282 would be useless. Such a signal might be controlled, for example, by a spare contact on relay 366 or relay 292. If controlled by relay 292 the indication would be continuous, while if controlled by relay 366 the indication would be given by a series of flashes or a series of strokes on a bell, either of which would give the code of the incoming indication. When these codes have been memorized by the despatcher, he will be able to recognize the indication by the impression made on eye or ear, thereby avoiding the necessity of watching the lamps 385. I do not consider, however, that such additional indication receiving devices would eliminate the necessity for the lamps 385, because these lamps not only give the indication at the time it is transmitted but they retain such indication until the condition which it represents is removed.

In the present application I have, for convenience and simplicity, illustrated my invention as applied only to a single track railway. I do not wish to be limited to this specific adaptation, however, because the invention is applicable equally well to a railway having any number of tracks.

In Fig. 4 I have shown one form of device which may be employed for operating the indication contacts 310, 311, 312 and 313 of Fig. 3. This device which is designated as a whole by the reference character AA, comprises a block or frame 396 on which an operating bar 397 is mounted to reciprocate longitudinally in suitable guides. This bar is provided with two dogs $399^N$ and $399^R$. Pivotally attached to an upstanding pillar 402 on the frame 396 are two arms $400^N$ and $400^R$ which normally rest on stops 401, and pivotally mounted at the outer ends of these arms respectively are two pawls $403^N$ and $403^R$. Each pawl is free to swing towards the pillar 402, but when swung away from the pillar it engages a stop 403 on the associated arm and so swings the arm upwardly from its normal position of rest on stop 401. Attached to the top of each arm $400^N$ and $400^R$ near the outer end thereof is a contact-operating block 405 of insulating material. Surmounting the pillar 402 is a block 404 of insulating material which carries two pairs of contacts 312 and 313. Each contact is normally open because the corresponding arm 400 is biased to its lowest position by gravity and by the action of the lower spring of the contact. When either arm 400 is swung upwardly from its biased position, however, the associated contact is closed due to the action of block 405.

The operating bar 397 is attached to the switch operating mechanism or to the signal with which the device AA is associated. In the case of a switch, the bar 397 may be attached to the locking bar in the switch mechanism, which bar makes part of a stroke while the switch is being unlocked, and completes its stroke to lock the switch after the shifting of the switch is completed. The parts are so arranged that when the switch is locked in the normal position the operating bar 397 occupies the position shown in Fig. 4, wherein both contacts 312 and 313 are open. When the switch is to be moved to the reverse position, the preliminary or unlocking movement of the lock bar shifts 397 to the right, carrying the dog $399^N$ past the pawl $403^N$, but during this movement the pawl swings freely to the right and so does not have any effect on contact 313. After the movement of the switch is completed, the final movement of the locking bar to lock the switch causes dog $399^R$ to engage pawl $403^R$, thereby swinging arm $400^R$ upwardly and so causing contact 312 to close momentarily. The movement of bar 397 is such as to carry the dog $399^R$ beyond the pawl $403^R$, however, so that contact 312 again opens and the parts come to rest with the dog $399^R$ in the same position with relation to the pawl $403^R$ as the position of dog $399^N$ with relation to pawl $403^N$ as the device is shown in the drawing.

When the switch is moved from reverse to normal position, the dog $399^R$ passes pawl $403^R$ without causing contact 312 to close, but during the operation of locking the switch in normal position dog $399^N$ engages pawl $403^N$ to close contact 313 momentarily.

In the case of a signal, the reciprocating bar 397 may be attached directly to the semaphore, or it may be attached to some part of the operating mechanism of the signal. The parts are then so arranged that when the signal is in the stop position the bar 397 occupies the position shown in Fig. 4, but that when the signal is moved to the caution position the bar 397 is moved to such extent as to cause dog $399^R$ to occupy a position slightly to the right of pawl $403^R$. It follows that contact 312 will be closed momentarily just before the signal reaches the full caution position and contact 313 will be closed momentarily just before the signal reaches the stop position. In accordance with the reference characters used in Fig. 3, the two contacts 312 and 313 would, in the case of a signal, be designated 310 and 311, respectively.

The indication transmitting apparatus shown in Fig. 3 is arranged to store one indication only. That is, if a second traffic controlling device completes an operation before the indication that a first device has operated is completed, the indication for the second device is "stored" in that it is not transmitted over the line until the indication for the first device has been completed. In some instances, however, it may be found necessary to store two or more indications. As a possible example of this, I will assume that signal $S^2$ has been cleared and that a locomotive running at high speed passes through track section 13—14 in such a short time that track relay $T^{10}$ picks up before the indication that this track relay has opened is completed. Under these conditions it will be necessary to store the indication that signal $S^2$ has moved to the stop position, and also to store the indication that track relay $T^{10}$ has picked up, until the indication that this track relay has opened is completed. One form of apparatus for accomplishing this result is illustrated in Fig. 7, which view is the same as Fig. $3^b$ except that an additional relay DD is interposed between relay 370 and relay $D^x$.

The operation of the apparatus shown in Fig. 7 is as follows:

Assuming that signal $S^2$ has been cleared and that a locomotive enters section 13—14 moving toward the left, the first operation of the traffic controlling apparatus will be the opening of track relay $T^{10}$. This will close at the back point of contact 309 the pick-up circuit for relay $D^T$, which circuit will be subsequently opened, however, by the opening of contact 394 of relay 370. While relay $D^T$ is closed, however, it closes the pick-up circuit for relay $W^T$, and as soon as the latter relay becomes closed, its stick circuit is closed through contact 330 and the upper front point of relay $W^T$. This closes the circuit for relay Z, and the closing of relay Z closes the circuit for relay B, so that motor BB is operated to transmit to the dispatcher's office the code signal indicating that track relay $T^{10}$ has opened. Before this code signal is completed, one of the contacts 311 is closed momentarily because signal $S^2$ moves to the stop position, and this closes the pick-up circuit for relay $D^s{}_s$. Relay $W^s{}_s$ does not close, however, because its pick-up circuit is open at the back point of contact 367 of relay Z, and so the stick circuit for relay $D^s{}_s$ becomes closed at the front point of this contact. Before the indication that track relay $T^{10}$ has opened is completed, this relay again closes, due to the locomotive passing out of section 13—14. The closing of the front point of contact 309 of track relay $T^{10}$ closes a pick-up circuit for relay DD, which circuit passes from battery $K^3$, through wires 318 and 420, contact 309 of track relay $T^{10}$, wires 421 and 422, back contact 395 of relay 370, wire 407, winding of relay DD, and wires 408, 313, 314 and 315 to battery $K^3$. Relay Z is still closed because relay $W^T$ is closed, and so a stick circuit for relay DD becomes closed which circuit passes from battery $K^3$, through wires 318, 319, 316 and 317, front point of contact 409 of relay Z, wire 410, front point of contact 416 of relay DD, wire 411, winding of relay DD and wires 408, 313, 314 and 315 to battery $K^3$. It follows that relay DD remains energized after its pick-up circuit is opened at contact 395 of relay 370. Relays DD and $D^s{}_s$ are then both closed by virtue of holding or stick circuits which are controlled by front contacts of relay Z. As soon as the indication that track relay $T^{10}$ has opened is completed, relay $W^T$ opens, thereby de-energizing relay Z. The opening of the front point of contact 367 of this relay opens the holding circuit for relay $D^s{}_s$, and the opening of the front point of contact 409 of relay Z opens the holding circuit for relay DD. Before relay $D^s{}_s$ can release, however, the pick-up circuit for relay $W^s{}_s$ becomes closed at the back point of contact 367 of relay Z, and before relay DD can release the pick-up circuit for relay $D^x$ becomes closed at the back point of contact 409 of relay Z, this latter circuit being from battery $K^3$, through wires 318, 319, 316 and 317, contact 409, wire 412, front point of contact 413 of relay DD, wire 414, winding of relay $D^x$, and wires 415, 313, 314 and 315 to battery $K^3$. The closing of relay $W^s{}_s$ closes the circuit for relay Z so that the latter relay again becomes energized whereupon a holding circuit for relay $D^x$ is closed, which circuit passes from battery as before, through the front point of contact 409 of relay Z, wire 410, back point of contact 416 of relay DD, wire 417, contact 418 of relay $D^x$, wire 419, winding of relay $D^x$, wire 415, and thence as before to battery $K^3$. Relay $W^s{}_s$ being closed, the indication will be transmitted that signal $S^2$ has moved to the stop position, and as soon as this indication is completed relay $W^s{}_s$ will open, thereby again de-energizing relay Z. The opening of relay Z will open the holding circuit for relay $D^x$, but before this relay can release the pick-up circuit for relay $W^x$ becomes closed through the back point of contact 409 of relay Z, back point of contact 413 of relay DD, and contact 423 of relay $D^x$. The holding circuit for relay $W^x$ will then close, relay Z will again close, and the apparatus will consequently transmit the code signal indicating that track relay $T^{10}$ has closed.

The arrangement shown in Fig. 7 is merely illustrative of the fact that means may be provided for storing as many indications as may be necessary. In other words, additional relays, corresponding to relay DD, may be interposed between this relay and relay 370. Furthermore, one or more relays corresponding to relay DD may be associated with any one or all of the remaining relays D, depending on the conditions met with in actual installations.

Although I have herein shown and described only certain forms of apparatus embodying my invention, it is understood that various changes and modifications may be therein within the scope of the appended claims without departing from the spirit and scope of my invention.

Having thus described my invention, what I claim is:

1. In combination, a stretch of railway track, a plurality of groups of devices for governing traffic through said stretch, code-controlled selecting mechanism for each group comprising a plurality of contacts for choosing any desired device in the group for operation, means controlled from a central point for operating any desired contact in any one of said selecting mechanisms, and track circuits for said stretch for controlling said traffic governing devices.

2. In combination, a stretch of railway track, a signal governing traffic through said stretch, a circuit for controlling said signal, track circuits for said stretch for controlling said circuit, a normally open contact, means controlled from a distant point for momentarily closing said contact, a normally open auxiliary relay for controlling said circuit, a pick-up circuit for said auxiliary relay including said contact, and a holding circuit for said auxiliary relay excluding said contact but including a front contact of a track relay operated by a train passing said signal.

3. In combination, a stretch of railway track, a signal governing traffic through said stretch, a circuit for controlling said signal, track circuits for said stretch for controlling said circuit, a normally open auxiliary relay for controlling said circuit, means including a code-operated selector controlled from a distant point for closing said auxiliary relay, and means for subsequently keeping said auxiliary relay closed until a train passes said signal.

4. In combination, a stretch of railway track, a signal governing traffic through said stretch, a line circuit for controlling said signal, track circuits for said stretch for controlling said line circuit, a normally open contact included in said line circuit, means controlled from a distant point for closing said contact, and means for subsequently keeping said contact closed until a train passes said signal.

5. In combination, a stretch of railway track, a signal governing traffic through said stretch, a normally open contact for controlling said signal, code controlled means governed from a distant point and momentarily effective to close said contact, and means for subsequently keeping said contact closed until a train passes said signal.

6. In combination, a stretch of railway track, a signal governing traffic through said stretch, a normally open relay for controlling said signal, a normally open contact, means controlled from a distant point for momentarily closing said contact, a pick-up circuit for said relay including said contact, and means operative after said relay is closed to keep it closed until a train passes said signal.

7. In combination, a railway switch, means including a motor for causing reverse operations of said switch in response to reverse operations of the motor, code controlled selector means governed from a distant point, a track circuit, and means controlled jointly by said selector means and by said track circuit for causing reverse operations of said motor.

8. In combination, a railway switch, a signal governing traffic over said switch, code-controlled selecting means for said switch controlled from a distant point, and means for controlling said switch jointly by said signal and said selecting means.

9. In combination, a section of railway track, a switch located in said section, a track circuit for said section, a signal governing traffic over said switch and controlled by said track circuit, code-controlled selecting means for said switch controlled from a distant point, and means for controlling said switch jointly by said track circuit and said signal and said selecting means.

10. In combination, a railway switch, means including a motor for causing reverse operations of said switch in response to reverse operations of the motor, code controlled selector means governed from a distant point for causing reverse operations of said motor, a track circuit for said switch, and means for preventing movement of said switch in response to an operation of said selecting means if said track circuit is occupied by a train.

11. In combination, a railway switch, code-controlled selecting means for said switch controlled from a distant point for causing movements of said switch, a signal governing traffic over said switch, and means for preventing movement of said switch in response to an operation of said selecting means if said signal does not indicate stop.

12. In combination, a railway switch, code-controlled selecting means for said switch controlled from a distant point for causing movements of said switch, a track circuit for said switch, a signal controlled by said track circuit and governing traffic over said switch, and means for preventing movement of said switch in response to an operation of said selecting means unless said track circuit is unoccupied and said signal indicates stop.

13. In combination, a railway switch, selecting means for said switch controlled from a distant point for causing movements of said switch, a signal governing traffic over said switch, and means controlled by said signal for preventing movement of said switch in response to an operation of said selecting means until a given time interval after said signal changes from a proceed to a stop indication.

14. In combination, a railway switch, two normally open relays, means controlled by said relays for moving said switch in one direction or the other according as one relay or the other is closed, two normally open contacts, means controlled from a distant point for momentarily closing one contact or the other at will, pick-up circuits for said relays including said two contacts respectively, and a holding circuit for each relay excluding the corresponding contact but including a front contact of the relay itself.

15. In combination, a section of track including a railway switch, a track circuit for said section, two normally open relays, means controlled by said relays for moving said switch in one direction or the other according as one relay or the other is closed, two normally open contacts, means controlled from a distant point for momentarily closing one contact or the other at will, pick-up circuits for said relays including said two contacts respectively, means for controlling each pick-up circuit by said track circuit, and a holding circuit for each relay excluding the corresponding normally open contact but including a front contact of the relay itself.

16. In combination, a railway switch, a track circuit for said switch, a signal governing traffic over said switch, two normally open relays, means controlled by said relays for moving said switch in one direction or the other according as one relay or the other is closed, two normally open contacts, means controlled from a distant point for momentarily closing one contact or the other at will, pick-up circuits for said relays including said two contacts respectively, means for controlling each pick-up circuit by said track circuit and by said signal, and a holding circuit for each relay excluding the corresponding normally open contact but including the front contact of the relay itself.

17. In combination, a railway switch, two normally open relays, a signal governing traffic over said switch, means controlled by said relays for moving said switch in one direction or the other according as one relay or the other is closed, two normally open contacts, means controlled from a distant point for momentarily closing one contact or the other at will, pick-up circuits for said relays including said two contacts respectively, means for preventing either relay from closing unless said signal indicates stop, and a holding circuit for each relay excluding the corresponding normally open contact but including a front contact of the relay itself.

18. In combination, a railway switch, selecting means for said switch and having at least two normally open contacts, means for controlling said selecting means from a distant point to momentarily close either of said contacts at will, two normally open relays, means controlled by said relays for moving said switch in one direction or the other according as one relay or the other is closed, pick-up circuits for said relays including said two contacts respectively, and means for keeping each relay closed until the switch has made a complete movement in response to the closing of the relay.

19. In combination, a railway switch, selecting means for said switch controlled from a distant point for causing movements of said switch, a signal governing traffic over said switch, a contact controlled by said signal and arranged to be open when said signal indicates proceed and to close after the lapse of a given interval of time following a movement of said signal to stop, and means for preventing movement of said switch in response to an operation of said selector unless said contact is closed.

20. In combination, a railway switch, selecting means for said switch having at least two normally open contacts, means for controlling said selecting means from a distant point to close either of said contacts at will, two normally open relays, means controlled by said relays for moving said switch in one direction or the other according as one relay or the other is closed, pick-up circuits for said relays including said two contacts respectively, means for keeping each relay closed until the switch has made a complete movement in response to the closing of such relay, a signal governing traffic over the switch, and means controlled by said signal for preventing the closing of either of said relays in response to an operation of said selecting means until a given time interval after said signal changes from a proceed to a stop indication.

21. In combination, a stretch of railway track, a device for governing traffic through said stretch, a contact associated with said device and operated just before an operation of the device is completed, a relay controlled by said contact, a second relay, a pick-up circuit for said second relay controlled by a front contact of the first relay, indication transmitting apparatus set into operation when said second relay is closed, and means for keeping said second relay closed until an operation of said transmitting apparatus is completed.

22. In combination, a railway traffic governing device, a relay, means for closing said relay just before an operation of said device is completed, a second relay, means for closing said second relay when the first relay is closed, apparatus for transmitting an indication of the operation of said device to a distant point while said second relay is closed, and means for keeping said second relay closed until the transmission of such indication is completed.

23. In combination, a railway traffic governing device, a normally open relay, means for energizing said relay just before an operation of said device is completed, apparatus for transmitting an indication of the operation of said device when said relay is closed, and means for keeping said relay closed until the transmission of such indication is completed.

24. In combination, a railway traffic governing device, a relay, means for momentarily energizing said relay upon the completion of an operation of said device, a second relay, means for closing said second relay when the first relay is closed, a third relay, means for closing said third relay when the second relay is closed, apparatus for transmitting an indication of such operation of said device to a distant point while the second and third relays are closed, means for keeping said second relay closed until the transmission of said indication is completed, and means for keeping said third relay closed after the second relay opens until said apparatus is restored to its initial condition.

25. In combination, two railway traffic governing devices, two relays D one for each device, means controlled by each device for momentarily energizing the corresponding relay D upon an operation of the device, two relays W one for each device, a normally open relay Z, a pick-up circuit for each relay W including a front contact of the associated relay D and a back contact of relay Z, means for energizing relay Z when either relay W is closed, apparatus controlled by relay Z when closed for transmitting to a distant point an indication that one device or the other has operated depending on which relay W is closed, means for keeping relay W and consequently relay Z closed until the transmission of the indication is completed, and means operating if one relay D closes while an unassociated relay W is closed to keep such relay D closed until such relay W opens, thereby preventing the simultaneous transmission of two indications and causing successive transmission of such indications if one device operates before the indication of operation of the other device is completed.

26. In combination, a stretch of railway track, a device for governing traffic in said stretch, a normally open relay, means associated with said device for closing said relay when the device has completed an operation, apparatus set into operation when said relay is closed for transmitting an indication that such operation of said device has occurred, and means for keeping said relay closed until such indication has been completed.

27. In combination, a stretch of railway track, a device for governing traffic in said stretch, a normally open relay, means associated with said device for closing said relay when the device has completed an operation, apparatus set into operation when said relay is closed for transmitting a code signal constituting an indication that such operation of said device has occurred, and means for keeping said relay closed until such code signal has been completed.

28. In combination, a stretch of railway track, a plurality of devices for governing traffic in said stretch, a normally open relay for each device, apparatus controlled by each relay when closed for transmitting an indication that an operation of the corresponding device has occurred, means associated with each device for closing the corresponding relay when such operation of the device is completed, and means for keeping each relay closed until said apparatus has completed the transmission of the corresponding indication.

29. In combination, a stretch of railway track, a plurality of devices for governing traffic in said stretch, a normally open relay for each device, apparatus controlled by each relay when closed for transmitting an indication that an operation of the corresponding device has occurred, means associated with each device for closing the corresponding relay when such operation of the device is completed, means for keeping each relay closed until said apparatus has completed the transmission of the corresponding indication, and means interposed between one of said devices and the associated relay for delaying the closing of such relay if another of said relays is closed and for subsequently closing the first-mentioned relay after the second-mentioned relay opens, whereby if one device completes an operation while the indication for another device is being transmitted the indication for the first device will be stored until the indication for the second device is completed.

30. In combination, a stretch of railway track, a device for governing traffic in said stretch, a normally open relay, a pick-up circuit for said relay, means for momentarily closing said pick-up circuit when an operation of said device is completed, a holding circuit for said relay including a front contact of the relay and a normally closed circuit controller, and apparatus set into operation when said relay is closed for transmitting an indication that said operation of said device has occurred and for opening said circuit controller when the indication has been completed.

31. In combination, a plurality of railway traffic governing devices, selectors comprising contacts for controlling said devices, a transmission line to which said selectors are connected, means located at a central point for impressing control signals on said line to operate any desired contact in any desired selector, indication transmitting apparatus controlled by said devices for impressing indication signals on said line, receiving apparatus at said central point responsive to said indication signals for indicating operation of said devices, means for preventing transmission of a control signal over said line while an indication signal is being transmitted, and means for preventing transmission of an indication signal over said line while a control signal is being transmitted.

32. In combination, a plurality of railway traffic governing devices, selectors comprising contacts for controlling said devices, a transmission line to which said selectors are connected, means located at a central point for impressing control signals on said line to operate any desired contact in any desired selector, indication transmitting apparatus controlled by said devices for impressing indication signals on said line, receiving apparatus at said central point responsive to said indication signals for indicating operation of said devices, and means for preventing transmission of a control signal over said line while an indication signal is being transmitted thereover.

33. In combination, a plurality of railway traffic governing devices, selectors comprising contacts for controlling said devices, a transmission line to which said selectors are connected, means located at a central point for impressing control signals on said line to operate any desired selector contact, indication transmitting apparatus controlled by said devices for impressing indication signals on said line, receiving apparatus at said central point responsive to said indication signals for indicating operation of said devices, and means for preventing transmission of an indication signal over said line while a control signal is being transmitted thereover.

34. In combination, a stretch of railway track, a plurality of devices for governing traffic along said stretch, means including line wires for selectively causing operation of said devices from a central point, means including the same line wires for selectively indicating the operation of said devices at said central point, and means for preventing the transmission of an indication over said line wires while an operating signal is being transmitted.

35. In combination, a stretch of railway track, two successive signals $S^4$ and $S^6$ governing traffic in the same direction through said stretch, track circuits for said stretch including track relays; a line circuit for signal $S^4$ controlled by the track relays between said signals and including a normally open contact and an auxiliary relay $E^6$, a line circuit for signal $S^6$ controlled by the track relays in advance of signal $S^6$ and by a front contact of auxiliary relay $E^6$, and means controlled by the track relays between signals $S^4$ and $S^6$ for keeping relay $E^6$ closed while a train is between said signals, whereby when the said normally open contact is closed, both of said signals change to a proceed position and each signal remains in such position until it is passed by a train.

36. In combination, a stretch of railway track, two successive signals $S^4$ and $S^6$ governing traffic in the same direction through said stretch, track circuits for said stretch including track relays; a line circuit for signal $S^4$ including a front contact of each track relay between signals $S^4$ and $S^6$, said circuit also including a source of current, a normally open contact and an auxiliary relay $E^6$; means associated with each track relay between said signals and operating when the track relay is open to close a branch for said circuit including said relay $E^6$, and a line circuit for signal $S^6$ controlled by track relays in advance of signal $S^6$ and by a front contact of relay $E^6$.

37. In combination, a stretch of railway track, two successive signals governing traffic in the same direction through said stretch, track circuits for said stretch, a line circuit for the rear signal controlled by the track circuits between said two signals and including a normally open contact and an auxiliary relay, means controlled by the track circuits between said two signals for keeping said auxiliary relay closed while a train is between said signals, and a line circuit for the forward signal controlled by track circuits in advance of such signal and by said auxiliary relay.

38. In combination, a stretch of railway track, two successive signals governing traffic in the same direction through said stretch, track circuits for said stretch, a line circuit for the rear signal controlled by the track circuits between said two signals and including a normally open contact and an auxiliary relay, means controlled by the track circuits between said two signals for keeping said auxiliary relay closed while a train is between said signals, a line circuit for the forward signal controlled by track circuits in advance of such signal and by said auxiliary relay, and means for controlling said normally open contact from a distant point.

39. In combination, a section of railway track, a track circuit for said section including a track relay, a normally open auxiliary relay, a normally open contact, means controlled from a distant point for momentarily closing said contact, a pick-up circuit for said auxiliary relay controlled by said contact and by said track relay, a holding circuit for said auxiliary relay controlled by said track relay but not by said contact, a signal controlled by said auxiliary relay, a circuit controller associated with said signal and closed only when the signal gives a proceed indication, and a shunt path around said auxiliary relay including said circuit controller and said normally open contact.

40. In combination, a section of railway track, a track circuit for said section including a track relay, a normally open auxiliary relay, a normally open contact, means controlled from a distant point for momentarily closing said contact, a pick-up circuit for said auxiliary relay controlled by said contact and by said track relay, a holding circuit for said auxiliary relay controlled by said track relay but not by said contact, a signal controlled by said auxiliary relay, a circuit controller associated with said signal and closed only when the signal gives a proceed indication, a shunt path around said auxiliary relay including said circuit controller and said normally open contact, and means for opening said auxiliary relay when said signal gives a proceed indication and said normally open contact is closed.

41. In combination, a railway traffic controlling device, a normally open contact associated with said device and momentarily closed as an operation of the device is completed, and means controlled by said contact for indicating such operation of said device at a distant point.

42. In combination, a railway traffic controlling device, a normally open contact associated with said device and momentarily closed as an operation of the device is completed, and code-responsive means controlled by said contact for indicating such operation at a distant point.

43. In combination, a stretch of railway track, a plurality of traffic governing devices for said stretch, apparatus controlled by each device and set into operation when a movement of the device is completed to transmit an indication of such movement to a distant point, and means effective when a second device completes a movement before the indication for a first device is finished to store the indication for the second device until the indication for the first device is finished.

44. In combination, a stretch of railway track, a plurality of groups of traffic governing devices for said stretch, apparatus associated with each group for transmitting to a distant point distinctive code signals indicating that a movement of each device in the group has occurred, means effective when a second device in a group completes a movement before the indication for a first device in such group is finished to store the indication for the second device until the indication for the first device is finished, and means associated with said groups and operating when indications are stored simultaneously in two or more groups to cause successive transmission of indications from alternate groups.

In testimony whereof I affix my signature.

HERBERT A. WALLACE.